(12) United States Patent
Holmes et al.

(10) Patent No.: US 12,246,926 B2
(45) Date of Patent: Mar. 11, 2025

(54) BULK MATERIAL RETRIEVAL AND TRANSPORT SYSTEM AND METHODS

(71) Applicant: Owens-Brockway Glass Container Inc., Perrysburg, OH (US)

(72) Inventors: Kirk Holmes, Perrysburg, OH (US); Steven Will, Sylvania, OH (US); Manfred Robert Romstöck, Freudenberg (DE); Guenther Josef Mlynar, Wertheim-Bettingen (DE)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 685 days.

(21) Appl. No.: 17/492,548

(22) Filed: Oct. 1, 2021

(65) Prior Publication Data

US 2022/0106123 A1    Apr. 7, 2022

Related U.S. Application Data

(63) Continuation-in-part of application No. 17/061,302, filed on Oct. 1, 2020, now Pat. No. 11,912,608.

(51) Int. Cl.
| | | |
|---|---|---|
| B65G 3/04 | (2006.01) | |
| B65D 88/26 | (2006.01) | |
| B65D 90/20 | (2006.01) | |
| B65D 90/48 | (2006.01) | |
| B65G 69/18 | (2006.01) | |
| B66F 9/06 | (2006.01) | |

(Continued)

(52) U.S. Cl.
CPC ............... *B65G 3/04* (2013.01); *B65D 88/26* (2013.01); *B65D 90/205* (2013.01); *B65D 90/48* (2013.01); *B65G 69/18* (2013.01); *G01G 13/00* (2013.01); *B66F 9/063* (2013.01); *C03B 3/00* (2013.01)

(58) Field of Classification Search
CPC ................................ B65G 3/04; B65D 88/26
USPC ........................................................ 222/625
See application file for complete search history.

(56) References Cited

U.S. PATENT DOCUMENTS 3,602,400 A * 8/1971 Cooke .................. B65D 88/128
                                                       222/143
5,360,143 A * 11/1994 Stultz .................. B65D 90/046
                                                       222/105

(Continued)

FOREIGN PATENT DOCUMENTS

| DE | 2044237 A1 | 5/1971 |
|---|---|---|
| GB | 1269060 A | 3/1972 |

(Continued)

OTHER PUBLICATIONS

PCT Invitation to Pay Additional Fees, Where applicable, Protest Fee, Int. App. No. PCT/US2021/053252, Int. Filing Date: Oct. 1, 2021, Dated: Jan. 20, 2022.

(Continued)

*Primary Examiner* — Paul R Durand
*Assistant Examiner* — Michael J. Melaragno

(57) ABSTRACT

A bulk material transport system includes one or more bulk material transport bins, weighing platforms, and vehicles arranged in various combinations as bulk material transporters, assemblies, and units. The system is useful for coupling with a bulk material container, forming a reduced pressure region at an inlet of the transport bin, and dispensing bulk material into the transport bin through the reduced pressure region.

26 Claims, 25 Drawing Sheets

(51) Int. Cl.
*C03B 3/00* (2006.01)
*G01G 13/00* (2006.01)

(56) References Cited

U.S. PATENT DOCUMENTS

| | | | |
|---|---|---|---|
| 5,413,154 A | 5/1995 | Hurst, Jr. et al. | |
| 5,445,192 A * | 8/1995 | Hansen | B01J 49/75 |
| | | | 141/2 |
| 5,445,289 A * | 8/1995 | Owen | B65D 7/24 |
| | | | 222/105 |
| 6,179,467 B1 * | 1/2001 | Derby | B29C 66/1122 |
| | | | 383/117 |
| 8,425,173 B2 | 4/2013 | Lert et al. | |
| 8,696,010 B2 | 4/2014 | Toebes et al. | |
| 8,864,365 B2 | 10/2014 | Rodgers | |
| 8,919,801 B2 | 12/2014 | Toebes et al. | |
| 9,156,394 B2 | 10/2015 | Toebes et al. | |
| 9,321,591 B2 | 4/2016 | Lert et al. | |
| 9,327,903 B2 | 5/2016 | Toebes et al. | |
| 9,428,330 B2 | 8/2016 | Lopez | |
| 9,539,927 B2 | 1/2017 | Fitzgerald et al. | |
| 9,827,683 B1 | 11/2017 | Hance et al. | |
| 10,059,536 B2 | 8/2018 | Tomioka et al. | |
| 10,065,798 B2 | 9/2018 | Borders et al. | |
| 10,099,391 B2 | 10/2018 | Hance et al. | |
| 10,265,871 B2 | 4/2019 | Hance et al. | |
| 10,280,000 B2 | 5/2019 | Sullivan et al. | |
| 10,308,430 B1 * | 6/2019 | Brady | G06Q 10/083 |
| 10,479,255 B2 | 11/2019 | Krenek et al. | |
| 10,507,992 B2 | 12/2019 | Tackett et al. | |
| 10,752,157 B1 * | 8/2020 | Zeller | B65G 67/24 |
| 2004/0069808 A1 * | 4/2004 | Blain | B65G 3/04 |
| | | | 222/185.1 |
| 2007/0122257 A1 * | 5/2007 | Bauer | B65D 88/30 |
| | | | 414/288 |
| 2009/0008410 A1 | 1/2009 | Kosich | |
| 2009/0078410 A1 | 3/2009 | Krenek et al. | |
| 2011/0056964 A1 * | 3/2011 | Ambriz | B65D 88/548 |
| | | | 220/601 |
| 2011/0127178 A1 * | 6/2011 | Claussen | B65D 88/30 |
| | | | 414/809 |
| 2015/0060487 A1 * | 3/2015 | Orita | B67D 1/0891 |
| | | | 222/105 |
| 2015/0114996 A1 * | 4/2015 | Gallagher | B65D 88/26 |
| | | | 141/59 |
| 2016/0039433 A1 | 2/2016 | Oren et al. | |
| 2016/0297605 A1 | 10/2016 | Lopez | |
| 2017/0326996 A1 * | 11/2017 | Kotani | B60L 50/53 |
| 2018/0141752 A1 | 5/2018 | Nakanishi et al. | |
| 2019/0127147 A1 | 5/2019 | Wagner et al. | |
| 2019/0129371 A1 | 5/2019 | Wagner et al. | |
| 2019/0129399 A1 | 5/2019 | Wagner et al. | |
| 2019/0135555 A1 | 5/2019 | Wagner et al. | |
| 2019/0322505 A1 | 10/2019 | Tengvert et al. | |
| 2020/0031639 A1 | 1/2020 | Rauwolf | |
| 2020/0047997 A1 | 2/2020 | Van Staalduinen | |
| 2020/0102147 A1 | 4/2020 | Sullivan et al. | |
| 2022/0106104 A1 * | 4/2022 | Holmes | B65G 53/36 |
| 2022/0106106 A1 * | 4/2022 | Holmes | B01D 35/1573 |
| 2022/0106123 A1 * | 4/2022 | Holmes | B65D 90/623 |
| 2022/0106133 A1 * | 4/2022 | Rausch | B65G 3/04 |
| 2022/0106135 A1 * | 4/2022 | Holmes | B65G 67/06 |

FOREIGN PATENT DOCUMENTS

| | | | | |
|---|---|---|---|---|
| WO | WO-9518705 A1 * | 7/1995 | | B01F 13/10 |
| WO | WO-2013162352 A2 * | 10/2013 | | B65B 1/28 |
| WO | 2019154434 A2 | 8/2019 | | |
| WO | 2019199588 A1 | 10/2019 | | |
| WO | 2019206437 A1 | 10/2019 | | |
| WO | 2019206438 A1 | 10/2019 | | |
| WO | 2019238673 A1 | 12/2019 | | |
| WO | WO2020019064 A1 | 1/2020 | | |
| WO | 2020074242 A1 | 4/2020 | | |

OTHER PUBLICATIONS

PCT Notification of Int. Search Report and Written Opinion, In. App. No. PCT/US2021/053252, Int. Filing Date: Oct. 1, 2021, Mail Date: Mar. 14, 2022.

PCT Search Report and Written Opinion, Int. Serial No. PCT/US2021/053252, Int. Filing Date: Oct. 1, 2021, Applicant: Owens-Brockway Glass Container Inc., Mail date: Mar. 14, 2022.

* cited by examiner

BULK MATERIAL RETRIEVAL AND TRANSPORT SYSTEM AND METHODS

TECHNICAL FIELD

This patent application discloses innovations to bulk material handling and, more particularly, to systems and methods of retrieving and transporting bulk materials.

BACKGROUND

A conventional glass "batch house" includes a custom architectural installation specifically designed for glass manufacturing, and a glass batch handling system supported and sheltered by the architectural installation. The batch house is generally configured to receive and store glass feedstock, or "glass batch" materials, including glassmaking raw materials, for example, sand, soda ash, and limestone, and also including cullet in the form of recycled, scrap, or waste glass. The conventional glass batch house requires a specialized, dedicated, and permanent architectural installation including a tall building and a covered receiving platform and pit to receive glass batch from underneath railcars or trucks that arrive loaded with glass batch materials. The batch house also includes multi-story silos to store the glass batch, and glass batch elevators and conveyors to move the glass batch from receiving systems at a bottom of the pit to tops of the silos. The batch house further includes cullet pads at ground level to receive and store cullet, crushers to crush cullet to a size suitable for melting, and cullet elevators and conveyors to move crushed cullet to one of the silos in the batch house. The batch house additionally includes a mixer to mix the glass batch received from the silos, conveyors integrated with scales to weigh and deliver each glass batch material from the silos to the mixer, mixer conveyors to move the glass batch from the mixers to the hot-end subsystem, and dust collectors to collect dust from the various equipment. The installation occupies a large footprint and a large volumetric envelope, takes about one to two years to construct, cannot be relocated from one location to another, and tends to be a dusty and dirty environment.

SUMMARY OF THE DISCLOSURE

The present disclosure embodies a number of aspects that can be implemented separately from or in combination with each other.

Embodiments of a bulk material transporter include a hollow transport bin having an inlet and an outlet, an inlet closure having an open position for receiving bulk material and a closed position for blocking the inlet while not actively receiving bulk material, an outlet closure having an open position for discharging bulk material from the bin and a closed position blocking the outlet while not actively discharging bulk material, and a cradle that supports the bin in an upright orientation during receiving of bulk material through the inlet and discharging of bulk material through the outlet. The outlet is located at a tapered bottom portion of the bin, and the cradle supports the bin along a perimeter of the bin.

Embodiments of a bulk material transport unit include a table, a scale supported by the table, and a transport bin supported by the scale. The table, scale, and transport bin are together moveable among a plurality of locations along a floor, and the scale is in communication with a controller configured to receive information pertinent to an amount of bulk material contained by the transport bin.

Embodiments of a material handling method include coupling a transport bin with a bulk material container, forming a reduced pressure region at least at an inlet of the transport bin, and dispensing bulk material from the bulk material container and into the transport bin through the reduced pressure region.

Embodiments of a material handling method include measuring an amount of glass feedstock dispensed from a bulk material storage container using a mobile scale.

DETAILED DESCRIPTION

Figure 1A:
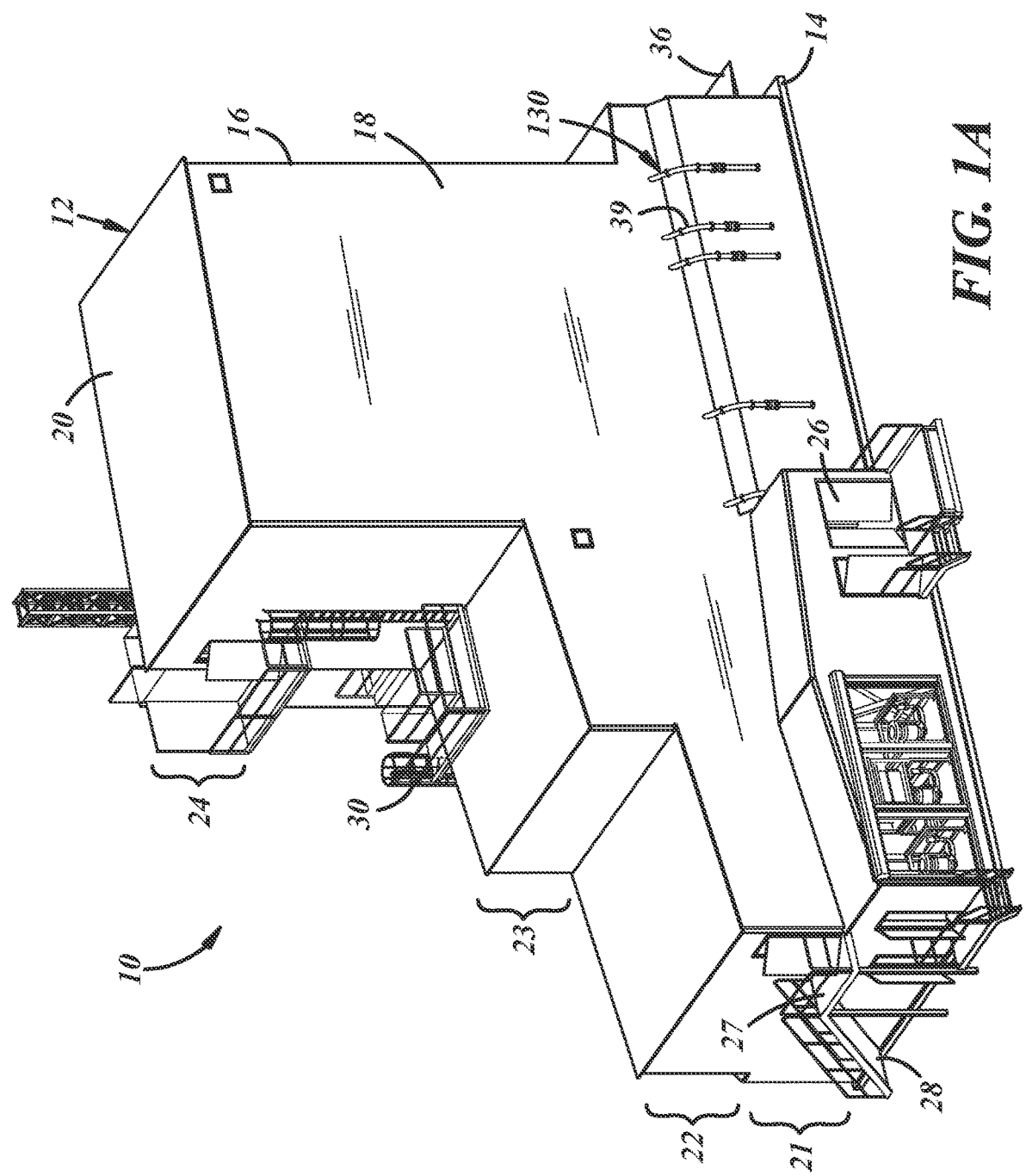
FIG. 1A is a perspective view of a bulk material handling system in accordance with an illustrative embodiment of the present disclosure, illustrating a building having a roof, cladding, elevator, stairs, ladders, and platforms.
Figure 1B:
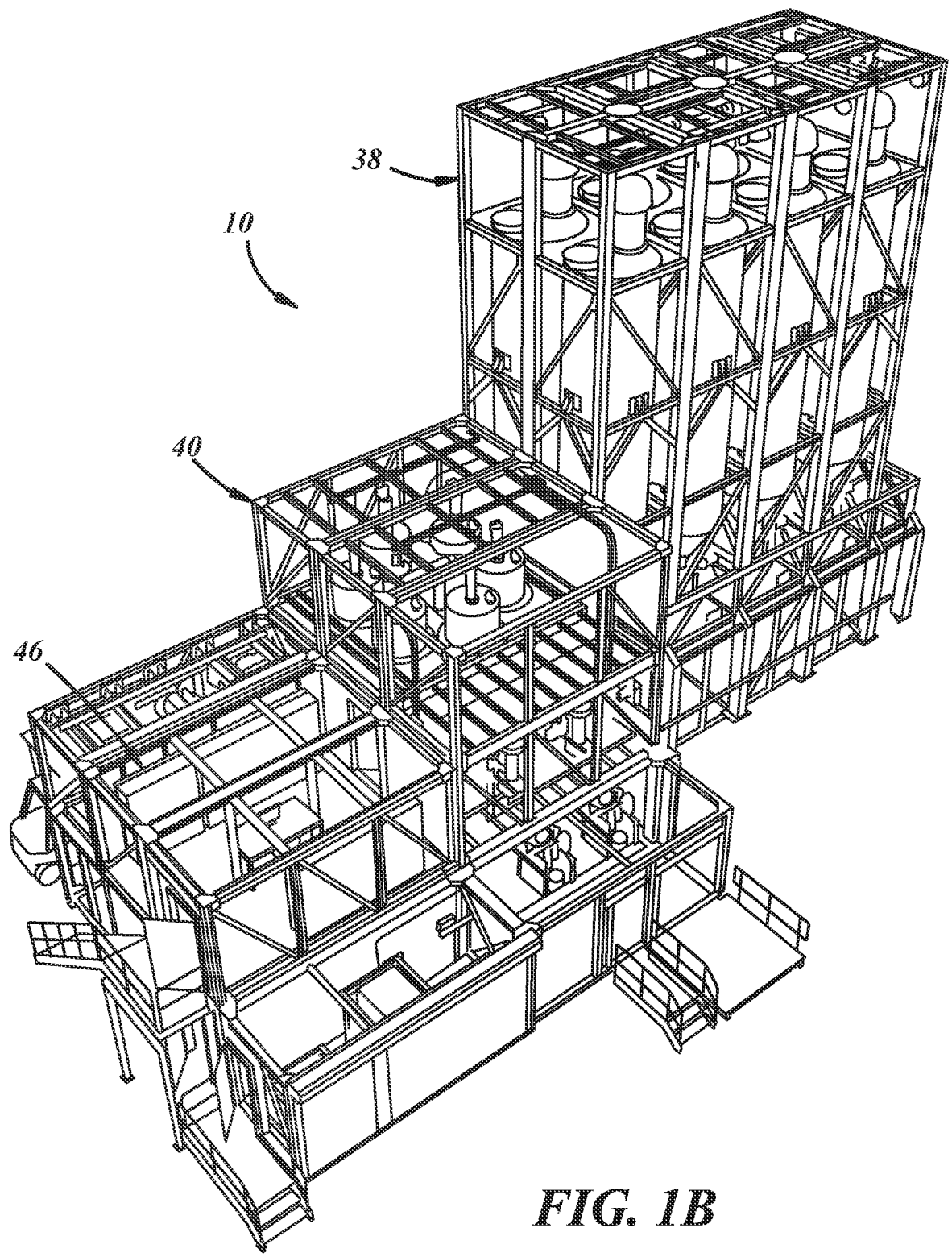
FIG. 1B is another perspective view of the system corresponding to FIG. 1A, without the roof, cladding, elevator, and ladders.
Figure 2A:
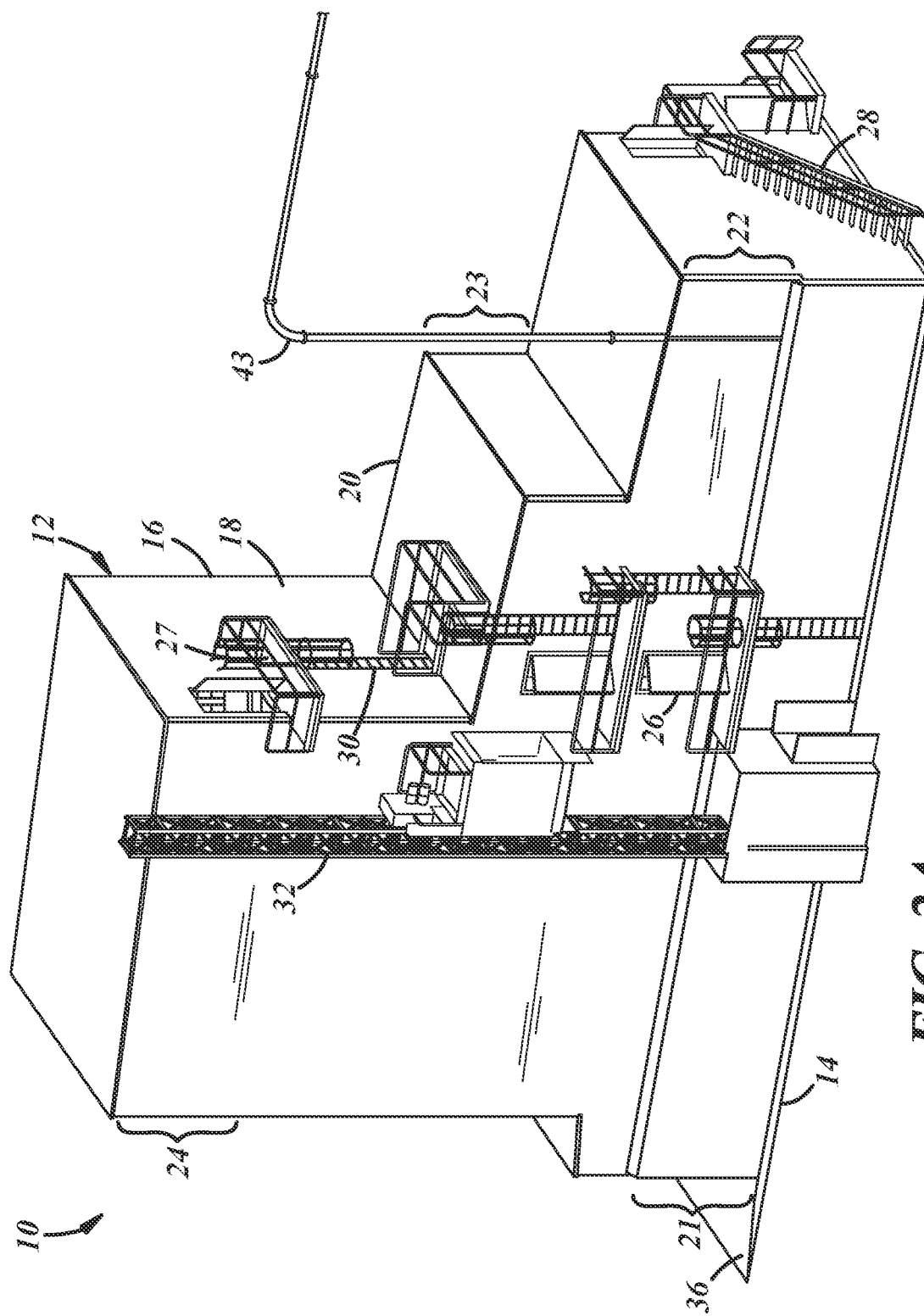
FIG. 2A is a different perspective view of the system of FIG. 1A, illustrating the building with the roof, cladding, elevator, stairs, ladders, and platforms.
Figure 2B:
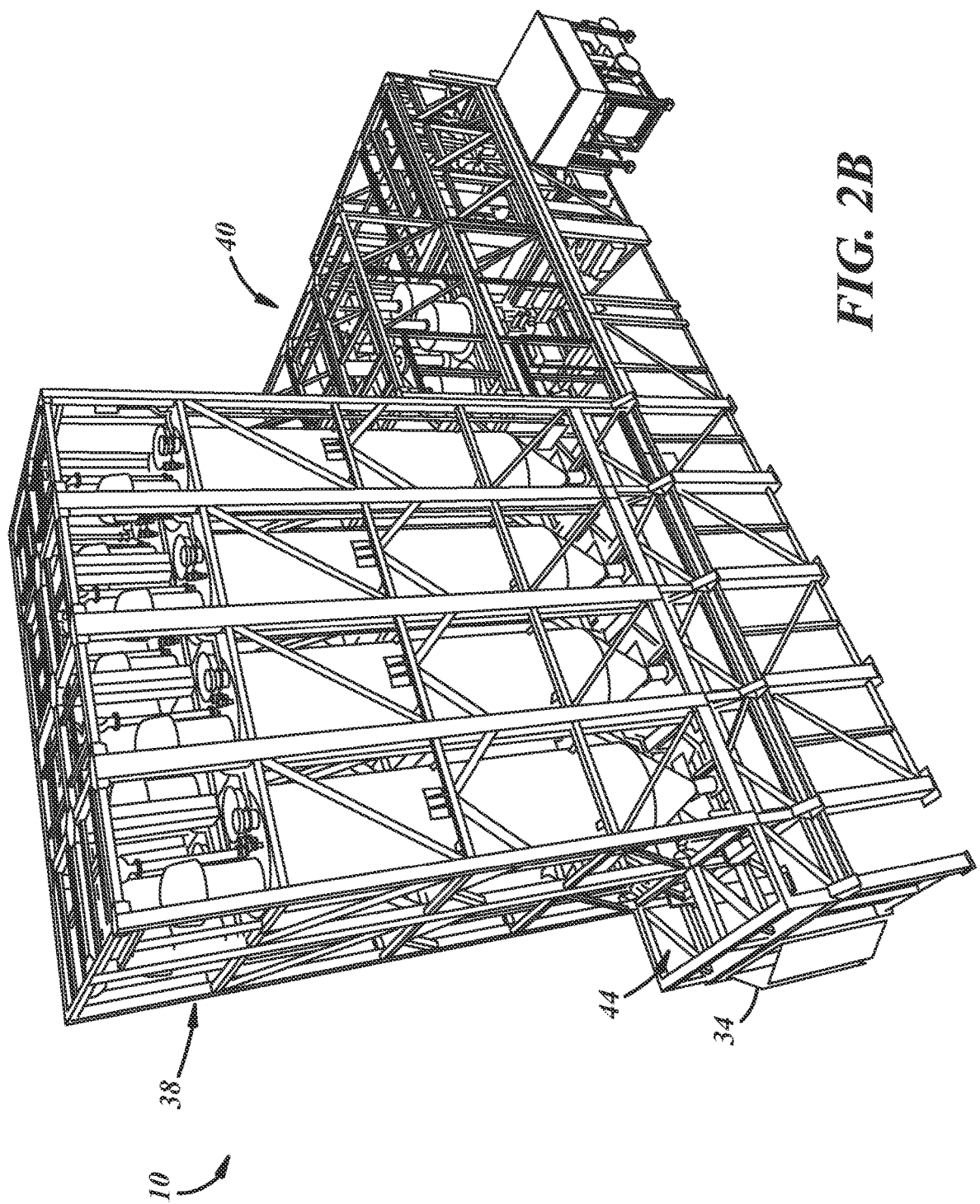
FIG. 2B is another perspective view of the system corresponding to FIG. 2A, without the roof, cladding, elevator, and ladders.
Figure 3:
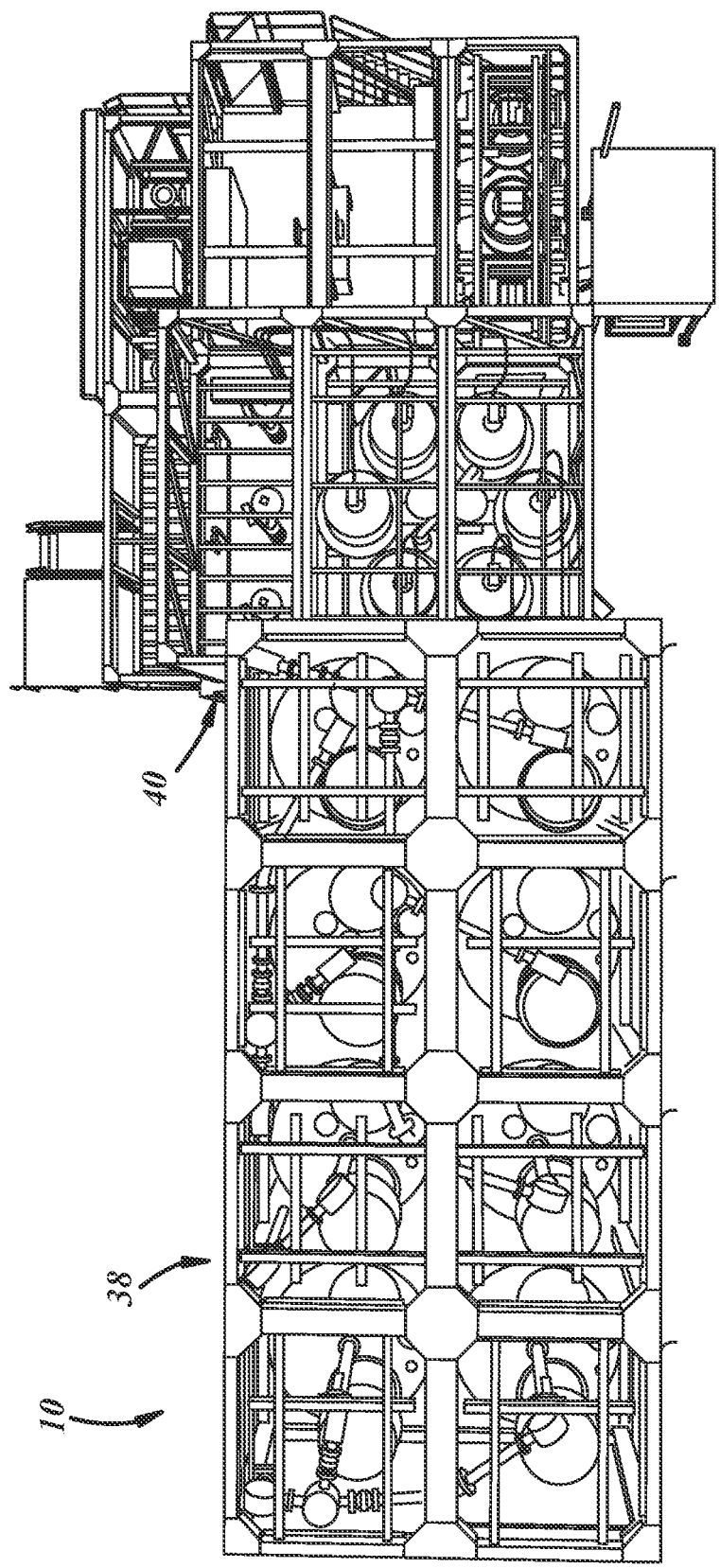
FIG. 3 is a top view of the system of FIG. 1A.
Figure 4:
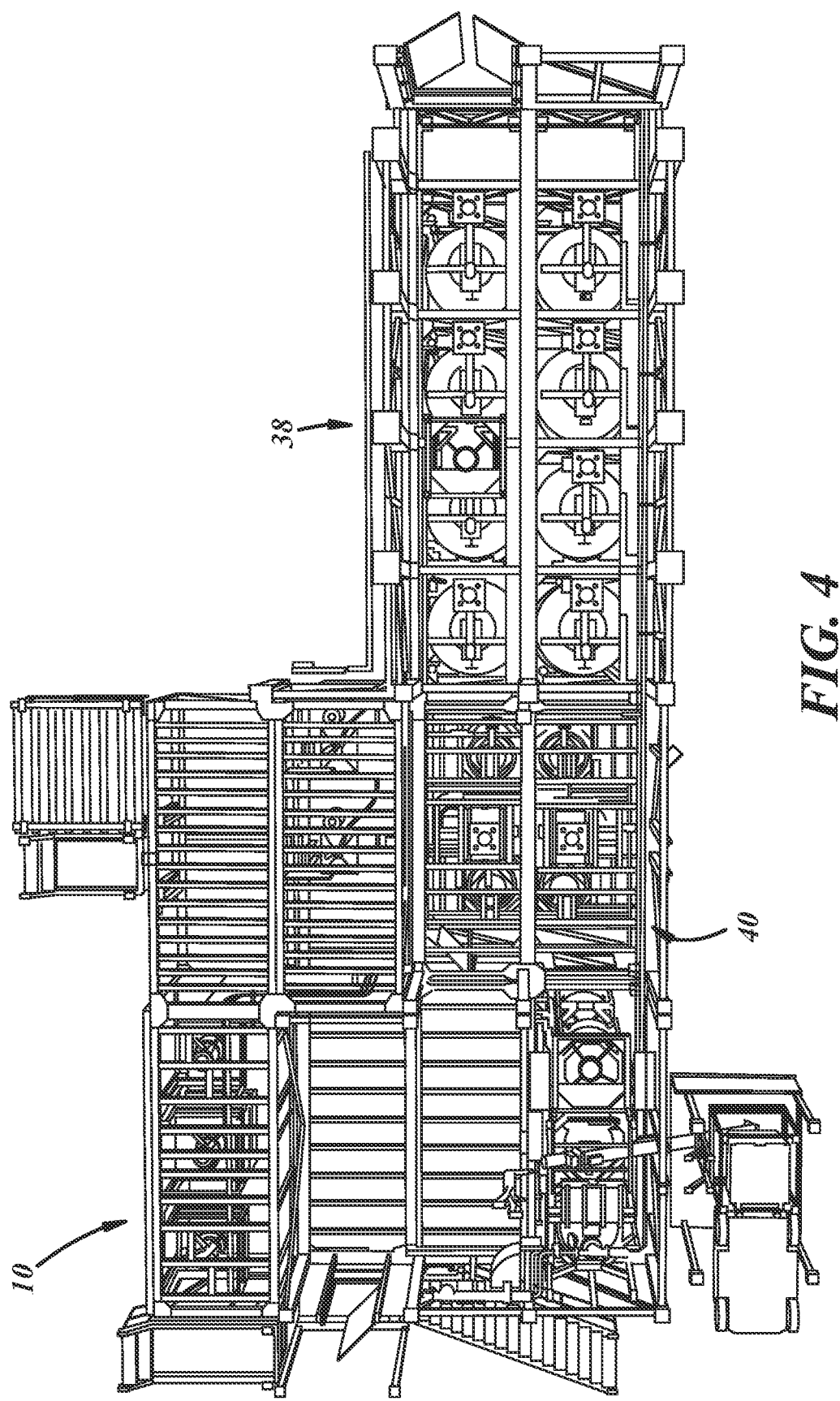
FIG. 4 is a bottom view of the system of FIG. 1A.
Figure 5:
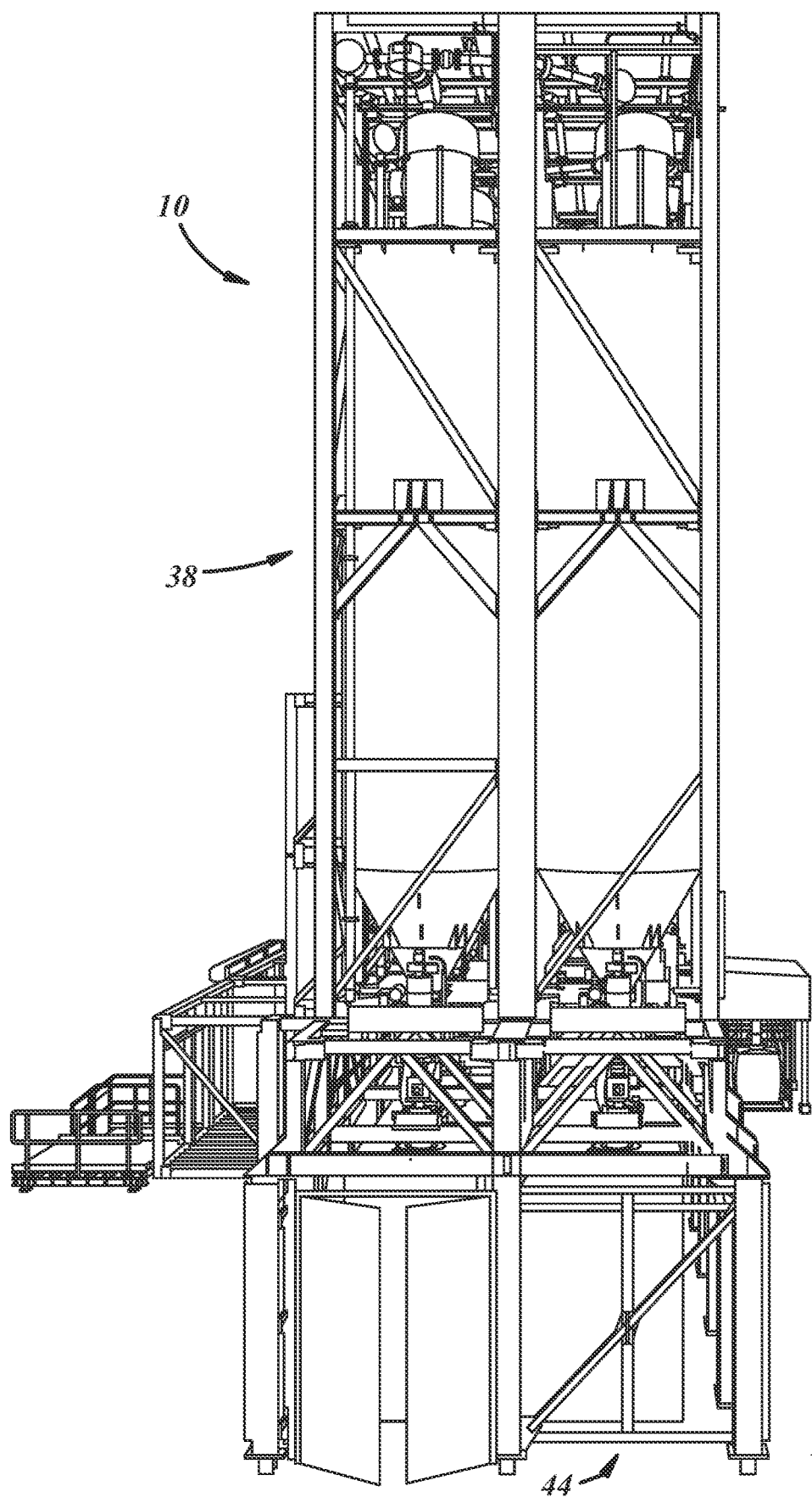
FIG. 5 is an end view of the system of FIG. 1A.
Figure 6:
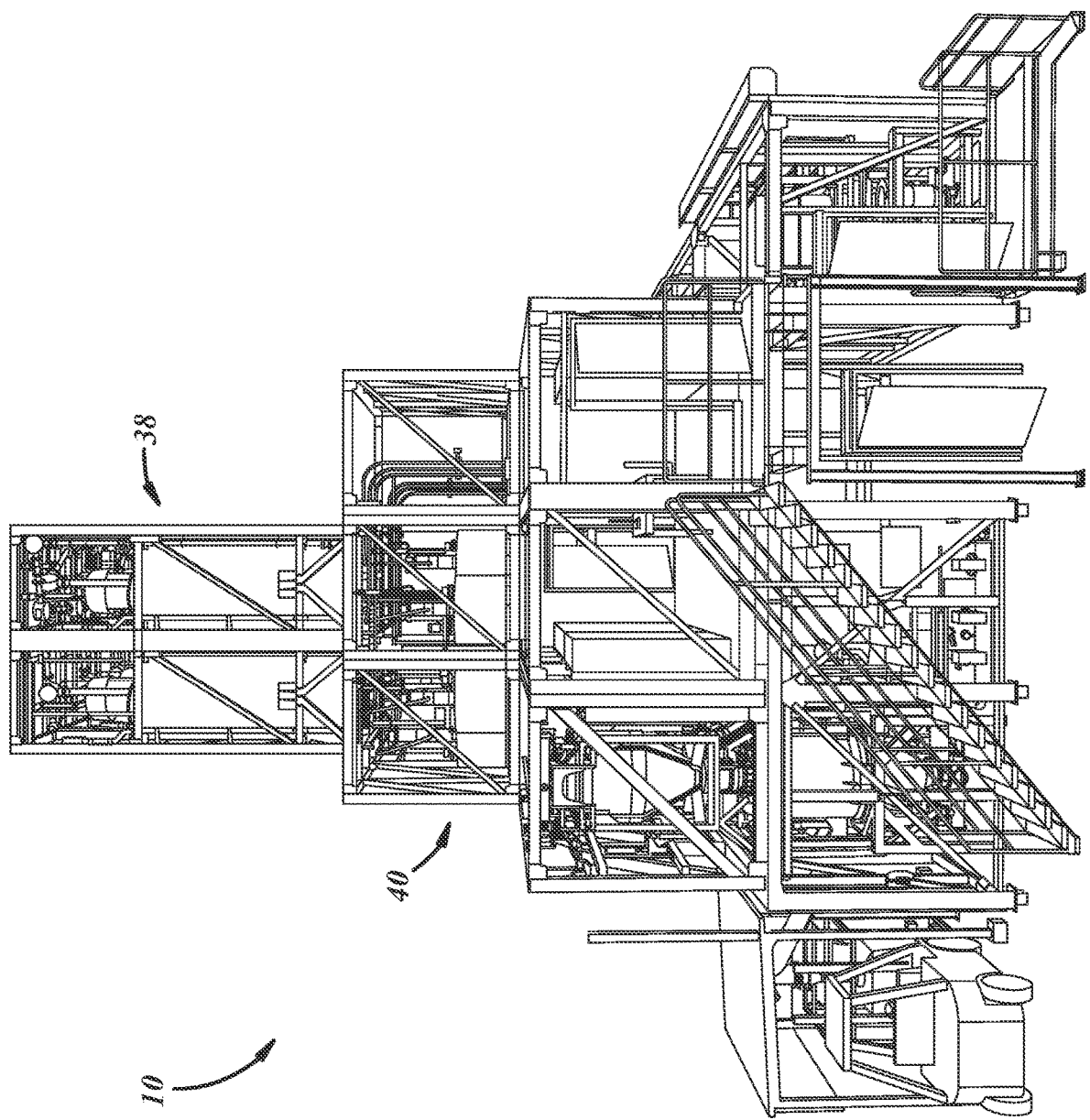
FIG. 6 is another end view of the system of FIG. 1A opposite that of FIG. 5.
Figure 7:
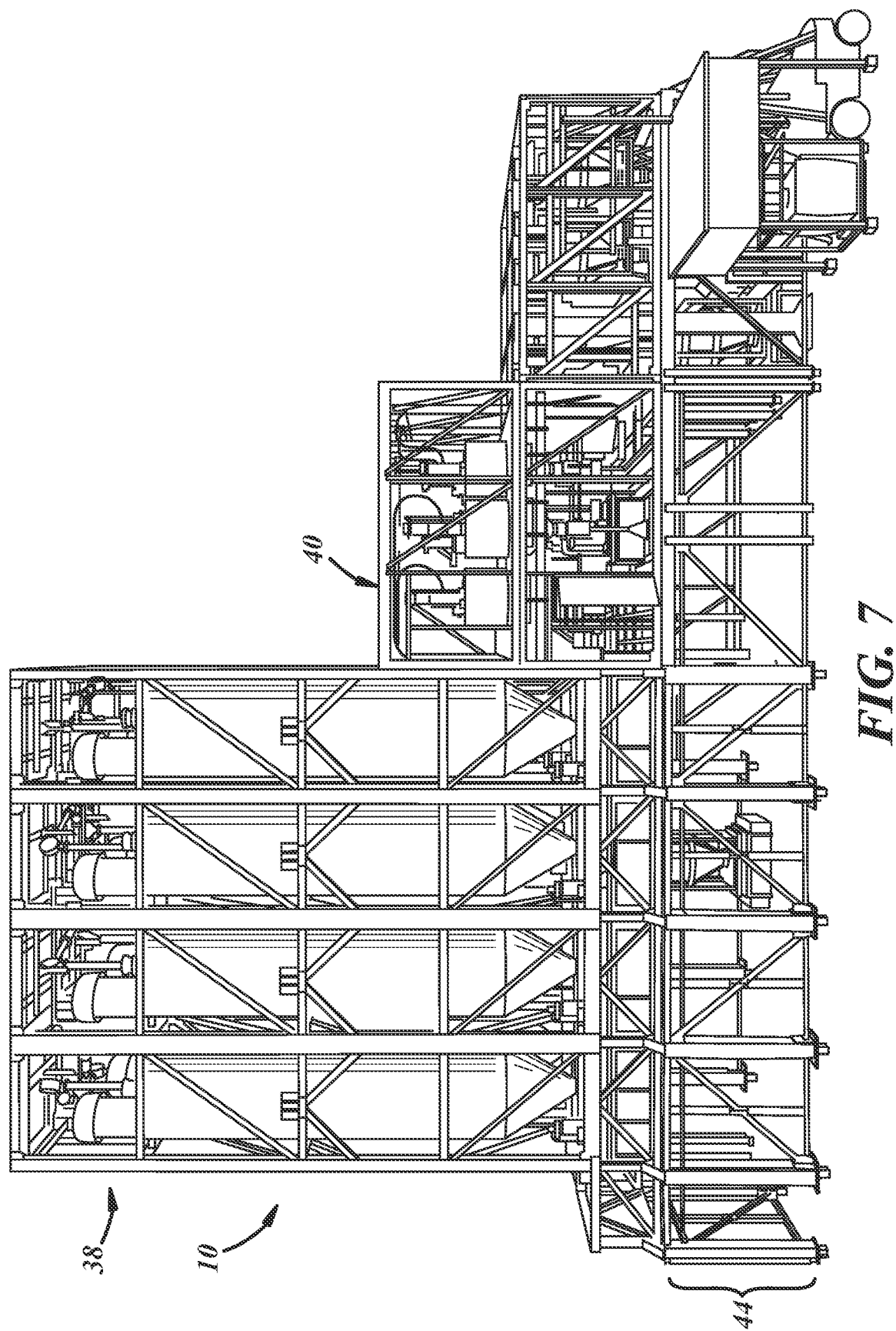
FIG. 7 is a side view of the system of FIG. 1A.
Figure 8:
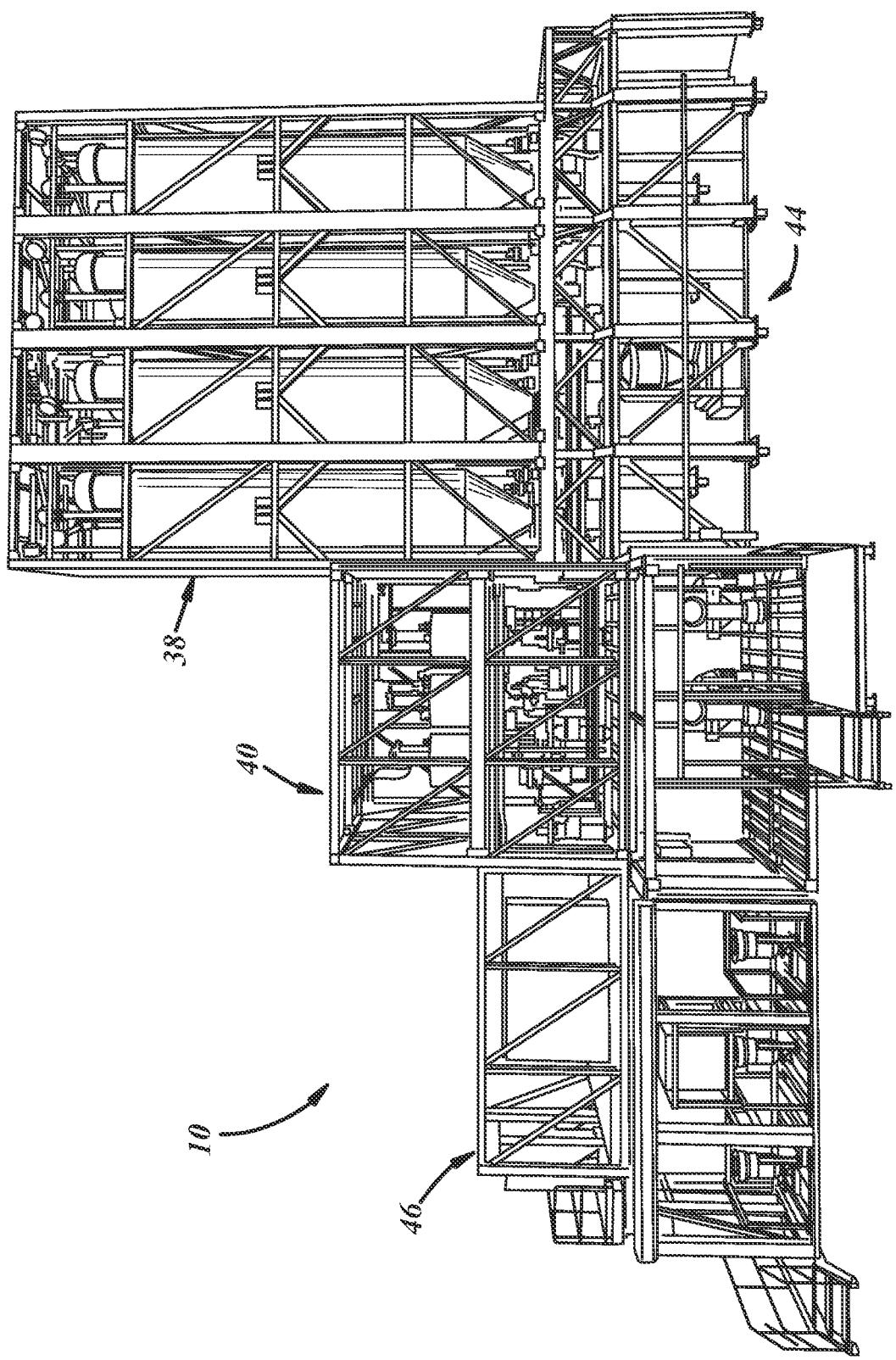
FIG. 8 is another side view of the system of FIG. 1A opposite that of FIG. 7.

In general, a new bulk material handling system is illustrated and described with reference to a glass feedstock handling system for a glass container factory as an example. Those of ordinary skill in the art would recognize that other glass factories, for example, for producing glass fibers, glass display screens, architectural glass, vehicle glass, or any other glass products, share many aspects with a glass container factory. Accordingly, the presently disclosed and claimed subject matter is not necessarily limited to glass containers, glass container feedstock handling systems, and glass container factories and, instead, encompasses any glass products, glass product feedstock handling systems, and glass product factories. Moreover, the presently disclosed and claimed subject matter is not necessarily limited to bulk material handling for the glass industry and, instead, encompasses any products, bulk material handling systems, and factories in any industry in which bulk material handling is useful.

Although conventional glass batch houses and methods enable efficient production of high-quality products for large-scale production runs, the presently disclosed subject matter facilitates implementation of a revolutionary bulk material handling system that is simpler than a conventional batch house, is modular and mobile, and is more compact and economical at least for smaller scale production runs or incremental additions to existing large-scale production runs. More specifically, in accordance with an aspect of the present disclosure, a new bulk material handling system may include prefabricated modular equipment configurations to facilitate rapid and mobile production capacity expansion in smaller increments and at lower capital cost than conventional glass batch houses, and also may include techniques for handling bulk material in a dust-free or reduced dust manner. Further, the new system may omit one or more conventional glass batch house subsystems or aspects thereof, as described in further detail below.

With specific reference now to FIGS. 1A through 8, a new bulk material handling system 10 includes a new architectural installation 12 and new subsystems and equipment supported and sheltered by the installation 12. The installation 12 includes a concrete foundation 14 having a floor which may include, for example, a four to six-inch-thick slab, and a bulk material handling building 16 on the foundation including walls 18 and a roof 20. The installation 12 requires no basement and no pit below the floor, such that the concrete foundation has earthen material directly underneath, wherein the foundation slab establishes the floor. As used herein, the term "pit" includes an elevator pit, conveyor pit, loading pit, and the like, located below grade or below ground level and that may require excavation of earthen material. As used herein, the term "basement" includes the lowest habitable level of the bulk material handling building below a floor of the building and can include a first level or a below grade or below ground level portion that may require excavation of earthen material.

The installation 12 also includes multiple habitable levels, including a base or first level 21, an intermediate or second level 22, an upper or third level 23, and an attic or fourth level 24. Also, as used herein, the term "habitable" means that there is standing room for an adult human in the particular space involved and there is some means of ingress/egress to/from the space while walking such as a doorway, stairway, and/or the like. The installation 12 further includes egress doors 26, egress platforms 27, stairs 28, ladders 30, and an elevator 32 to facilitate access to the egress platforms 27 and doors 26. The installation 12 additionally includes loading doors 34, loading platforms, and one or more ramps. Notably, the building 16 is constructed of many modules, including modular walls used to construct a base frame for the first level, and modular frames for the second, third, and fourth levels, as will be discussed in detail below.

With continued reference to FIGS. 1A through 8, the bulk material handling system 10 includes several subsystems that occupy a volumetric envelope much smaller than conventional batch houses such that the system 10 likewise requires a smaller volumetric envelope than conventional glass batch houses. The bulk material handling system 10 may be a glass bulk material handling system configured to receive and store glass feedstock or "glass batch." The glass batch includes glassmaking raw materials, including glass feedstock "majors" and "minors" and also may include cullet in the form of recycled, scrap, or waste glass. The bulk material handling system receives glass batch bulk materials and combines them into doses and provides the doses to a downstream hot-end system of a glass factory adjacent to or part of the bulk material handling system.

The bulk material handling system 10 includes one or more of the following subsystems. A first bulk material, or majors, subsystem 38 is configured to receive, pneumatically convey, store, and gravity dispense majors bulk material. Glassmaking majors may include sand, soda, limestone, alumina, saltcake, and, in some cases, dust recovery material. Similarly, a second bulk material, or minors subsystem 40 is configured to receive, pneumatically convey, and store minors bulk material from individual bulk material bags. Glassmaking minors may include selenium, cobalt oxide, and any other colorants, decolorants, fining agents, and/or other minors materials suitable for glassmaking. A bulk material discharging subsystem 54 is configured to receive bulk material from the majors and minors subsystems 38, 40 and transmit the bulk material to downstream bulk material processing equipment, for example, a glass melting furnace separate from and downstream of the bulk material handling system 10. A bulk material transfer or transport subsystem 44 is configured to receive bulk material from the majors and minors subsystems 38, 40, and transport the bulk material within, to, and from, the majors and minors subsystems 38, 40, and to and from the discharge subsystem 42. A controls subsystem 46 is in communication with various equipment of one or more of the other subsystems 38, 40, 42, 44, and is configured to control various aspects of the system 10. Those of ordinary skill in the art would recognize that the system 10 can be supplied with utility or plant electrical power, and can include computers, sensors, actuators, electrical wiring, and the like to power and communicate different parts of the system 10 together. Likewise, the system 10 can be supplied with plant or compressor pneumatic power/pressure, and can include valves, lubricators, regulators, conduit, and other like pneumatic components to pressurize and communicate different parts of the system 10 together.

The system 10 may be pneumatically closed from pneumatic input or receiving conduit 39 of the majors subsystem 38 to pneumatic output or transmitting conduit 43 of the discharging subsystem 54. The pneumatic receiving conduit 39 may extend through one or more walls of the building for accessibility to bulk transporters, e.g., trucks or rail cars, that bring bulk materials and that may have pressurized vessels to assist with pneumatic receiving and conveying of bulk material. The receiving conduit 39 has any suitable couplings for coupling to bulk transporters in a pneumatically sealed manner, wherein the bulk transporters may have pumps, valves, and/or other equipment suitable to pressurize the receiving conduit to push bulk material into the majors subsystem 38 and/or the batch handling system 10 itself may include pumps, valves, pressurized plant air plumbing, and/or other equipment suitable to apply positive and/or negative (vacuum) pressure to the input conduit to push and/or pull bulk material into the majors and minors subsystems 38, 40.

The transmitting conduit 43 may extend through one or more walls or the roof of the building for transmission to downstream bulk material processing equipment, for instance, in a hot end subsystem of a glass manufacturing system (not shown). For example, the transmitting conduit 43 is pneumatically sealingly coupled to a receiver hopper at a glass melter in the hot end subsystem. The conduit 43 may have any suitable couplings for coupling to the receiver hopper in a pneumatically sealed manner. Those of ordinary skill in the art would recognize that the bulk material handling system is pneumatically closed between the pneumatic receiving conduit and the pneumatic transmitting conduit. This is in contrast to conventional systems where bulk material is open to the surrounding environment. The phrase "pneumatically closed" means that the path, and the bulk materials following that path, from receiving conduit to transmitting conduit is/are enclosed, and not openly exposed to the surrounding environment, although not necessarily always sealed air-tight.

Figure 9:
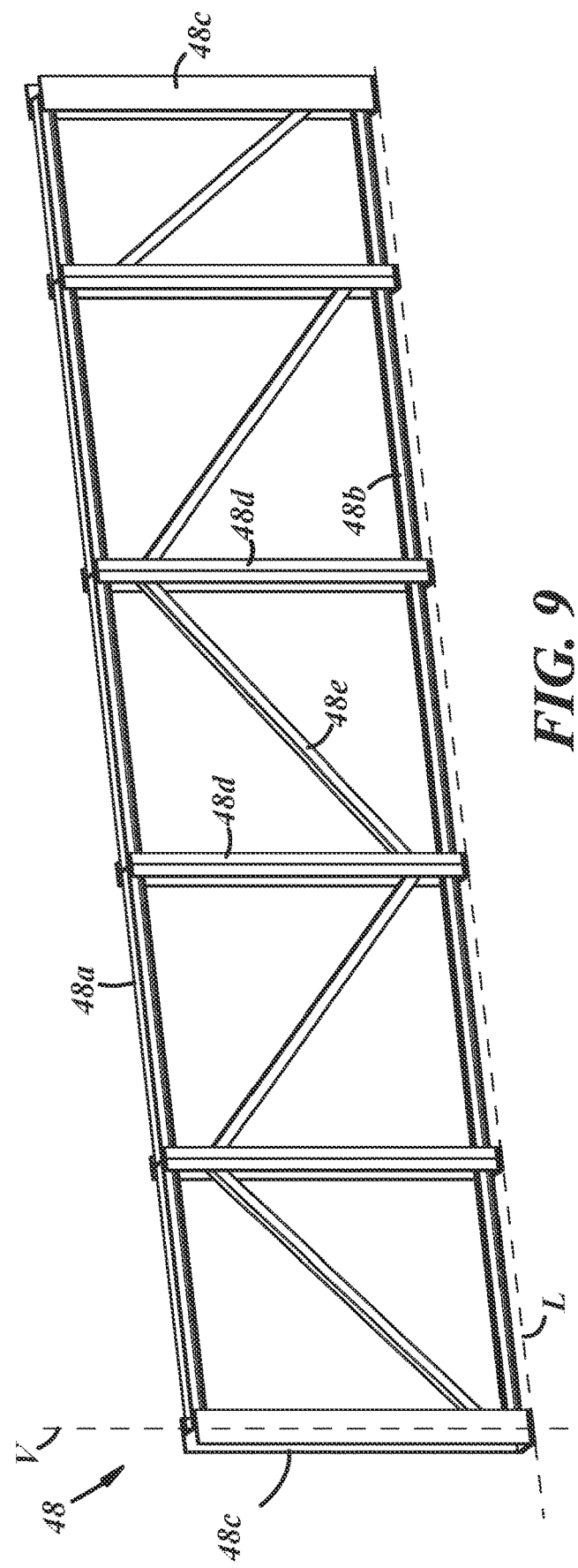
FIG. 9 is a perspective view of a modular frame of the system of FIG. 1A.
Figure 10:
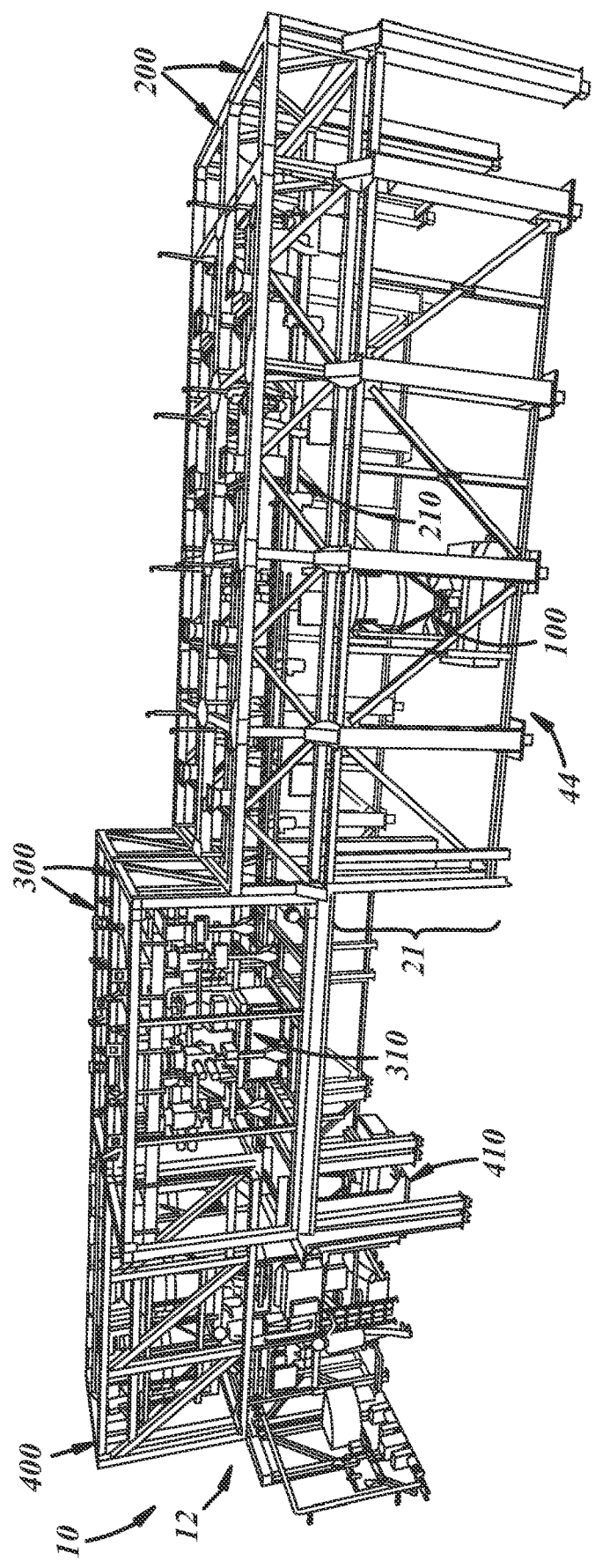
FIG. 10 is a perspective view of various modules of the system of FIG. 1A.

With reference to FIG. 9, a representative modular wall 48 of the first level 21 of the building is constructed as a rectangular truss, having a longitudinal axis L and a vertical axis V, and including lower and upper beams 48a,b extending longitudinally and being vertically opposed from one another. The wall 48 also includes vertically extending end posts 48c and intermediate posts 48d longitudinally between the end posts 48c, and struts 48e extending obliquely between the beams and connected to the posts 48c,d. The modular wall 48 is preassembled at an equipment fabricator, shipped from the fabricator to a product manufacturer, and is erected at the product manufacturer. The modular wall has exterior dimensions less than or equal to exterior dimensions of an intermodal freight container, more specifically, a height less than or equal to 9' 6" (2.896 m), a width less than or equal to 8' 6" (2.591 m), and a length less than or equal to 53' (16.154 m). As best illustrated in FIGS. 2B, 7, 8, and 10-13, the modular wall 48 may be used as a portion of a base frame establishing the habitable first level of the system and spanning the majors subsystem, the minors subsystem, and the discharging subsystem. In the majors subsystem, the system also includes a dispensing level frame constituted from two of the horizontal modular dispensing frames 50 of FIG. 10 situated side-by-side and carried on the base frame, and a storage container frame constituted from eight of the vertical modular container frames 52 of FIG. 11 situated in a 4×2 array carried on the dispensing level frame.

With reference to FIGS. 10-13, select modules of the installation 12 are shown to generally illustrate relevant portions of the overall system 10 with which the bulk material transport system 44 interacts. A primary component of the bulk material transport system 44 is a mobile bulk material transport unit 100, which is able to move among different locations of the installation 12. As discussed further below, the transport unit 100 is also separable into certain components or groups of components. As illustrated in FIGS. 10-13, the system 44 may include more than one transport unit 100 or parts of transport units. The main operating envelope of the transport system 44 is on the first level 21 of the building. Each transport unit 100 of the system 44 is configured to be moved among various locations along the floor of the first level 21 of the building, including a plurality of locations beneath bulk material dispensing modules 200 and dispensers 210 of the majors subsystem 38, a plurality of locations beneath bulk material dispensing modules 300 and dispensers 310 of the minors subsystem 38, and at least one location of a handling module 400 and handling station 410, where the transport unit 100 may be separated into individual components for its transported contents to be discharged into a transmission vessel 500 of the discharging subsystem 54 for subsequent processing at a melting furnace, for example, or into a reject material vessel. Although the transport units 100 may not physically interact with the controls subsystem 46, components of each transport unit 100 may be in real-time communication with a control module of the controls subsystem 46, and the bulk material transport system 44 may be considered to comprise certain elements of the control module and controls subsystem.

Figure 14:
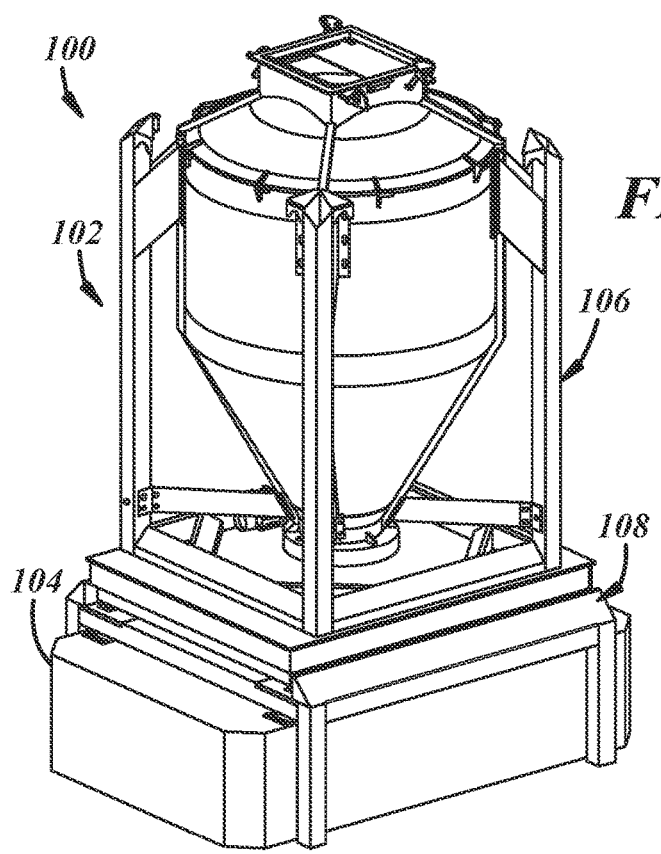
FIG. 14 is an isometric view of an illustrative bulk material transport unit.
Figure 15:
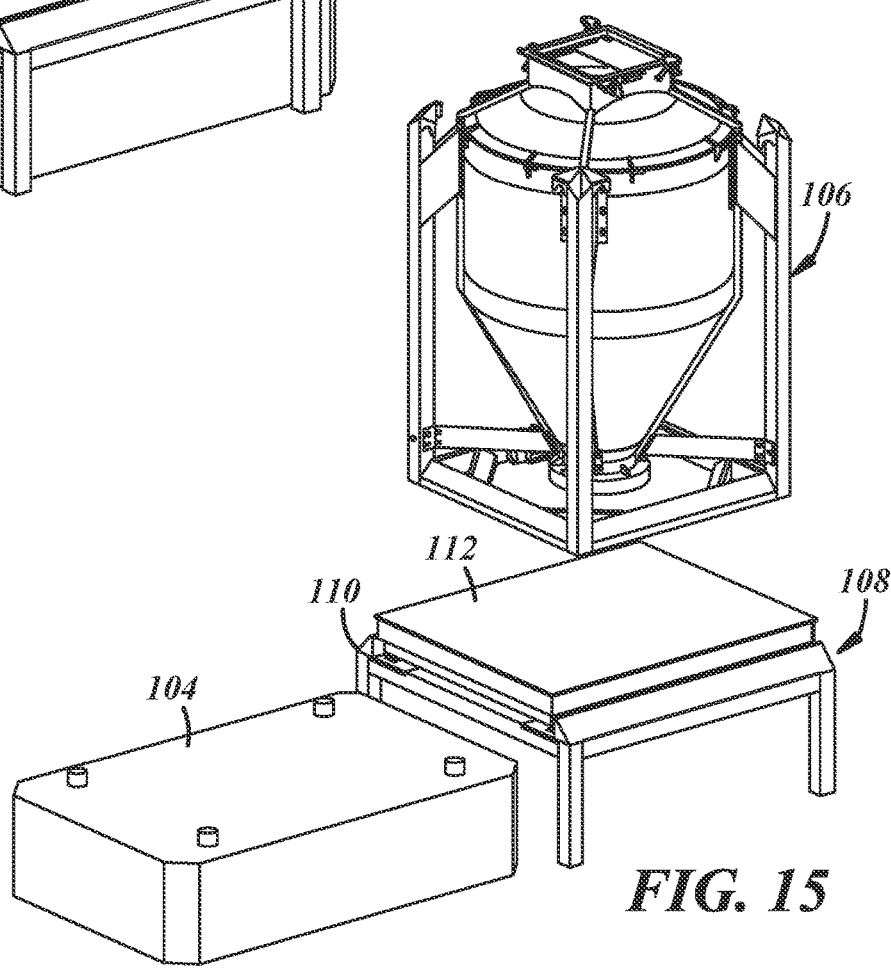
FIG. 15 is an isometric view of the transport unit of FIG. 14 illustrating its separable components.

FIGS. 14 and 15 are isometric views of an illustrative bulk material transport unit 100, which includes a bulk material transport assembly 102 supported by a vehicle 104. The transport assembly 102 and vehicle 104 are configured to move together along the floor of the installation 12 among a plurality of locations, but they are also separable from one another such that the vehicle 104 can move the transport assembly 102 to one location, detach itself from the transport assembly, and move itself to a different location, such as to the location of a different transport assembly 102 of the system 44 to temporarily become part of a different transport unit 100.

The transport assembly 102 includes a transporter 106 supported by a weighing platform 108, which includes a table 110 and a scale 112. The scale 112 is supported by the table 110, and the transporter 106 is supported by the scale 112 when part of the transport assembly 102. The transporter 106 and vehicle platform 108 are configured to move together along the floor of the installation 12 among a plurality of locations when supported by a vehicle 104, but they are also separable from one another such that the transporter 104 can be detached from the platform 108 at one location and the platform 108 can be moved by the vehicle 104 or other means to a different location.

Each transport unit 100 thus includes multiple distinct components 104, 106, 108 that are configured to move to various locations together and that are separable from each other such that they can all be at different locations at one time. The system 44 may therefore include different numbers of vehicles 104, transporters 106, and platforms 108 used in different combinations to form transport assemblies 102 and/or transport units 100. In some embodiments, the system 44 includes only one vehicle 104 and a plurality of transport assemblies 102, or a higher number of transporters 106 and weighing platforms 108 than vehicles 104.

Figure 16:
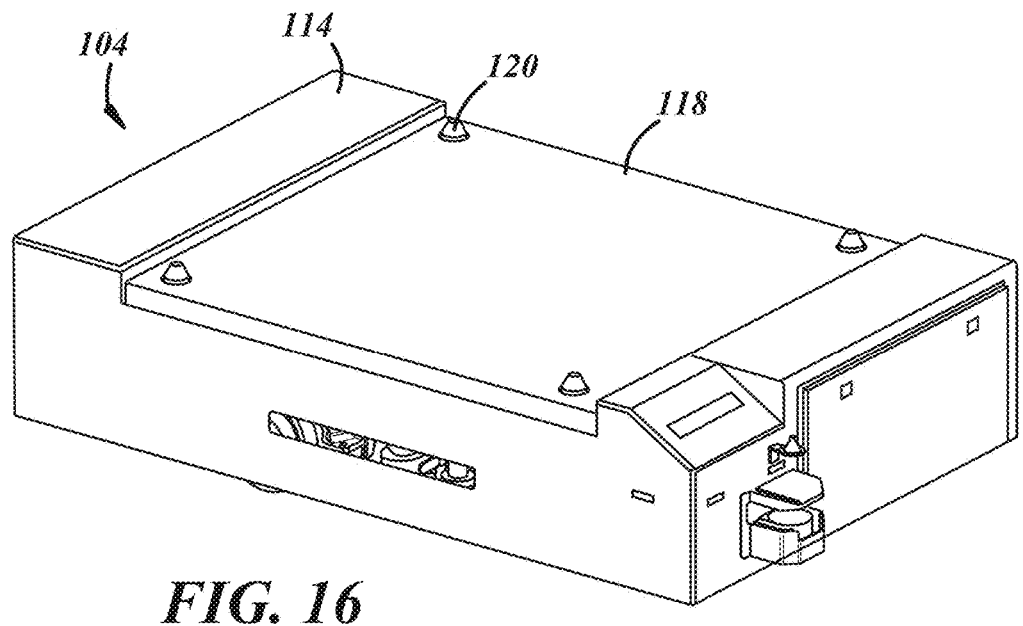
FIG. 16 is an isometric top view of a vehicle of the transport unit of FIG. 14.
Figure 17:
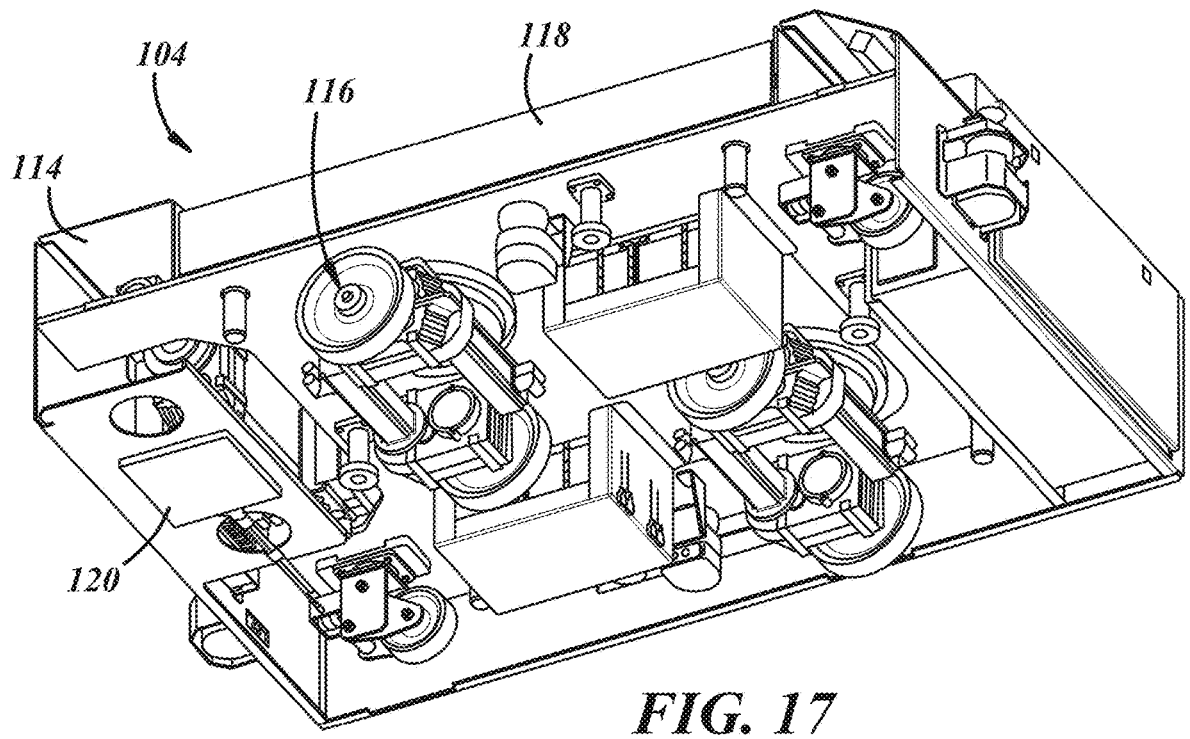
FIG. 17 is an isometric bottom view of the vehicle of FIG. 16.

With reference to FIGS. 16 and 17, the vehicle 104 may be an automated guided vehicle (AGV), including a body 114, a drive/steer system 116, a platform 118, a power source charging system 120, and a guidance system (not shown). The body 114 is the main structure of the AGV 104 to which the drive/steer system 116 and platform 118 are affixed and which protects many of the electric and electronic components therebeneath. The drive/steer system 116 propels the vehicle 104 along the ground via one or more motorized drive wheels and rotates the drive wheel or a non-drive wheel about a vertical axis to steer the vehicle. The drive/steer system 116 may include independent drive and steering components as well. The guidance system uses the drive/steer system to guide the AGV 104 along a desired path. Various guidance systems can be used, such as a sensor system that detects an electric or magnetic field produced by components along the ground and drives and steers the AGV to follow the field, or the AGV may be programmed with several distinct docking coordinate locations along the ground—such as fixed docking locations where bulk materials may be dispensed—and receive wirelessly communicated instructions from the controls subsystem 46 relating to the next destination of the vehicle 104.

Figure 11:
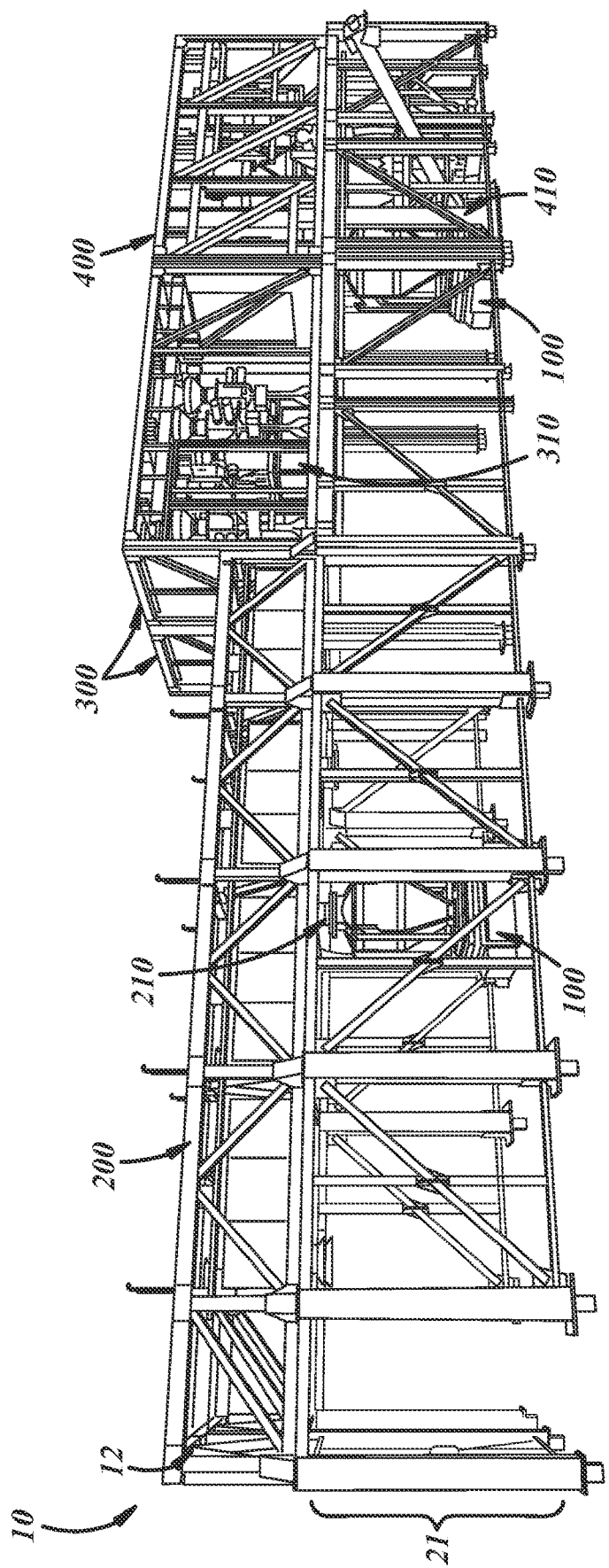
FIG. 11 is another perspective view of various modules of the system of FIG. 1A opposite that of FIG. 10.
Figure 12:
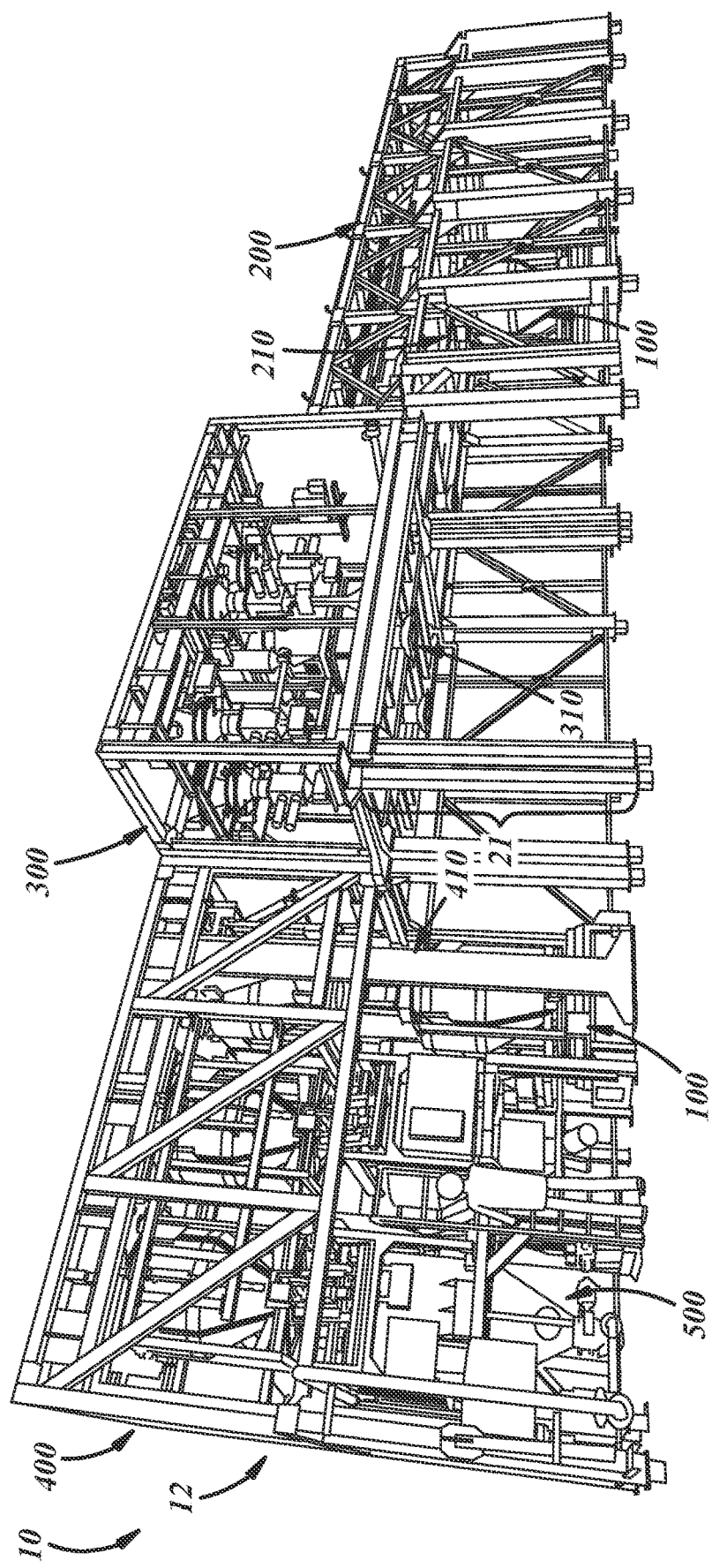
FIG. 12 is another perspective view of various modules of the system of FIG. 1A.
Figure 13:
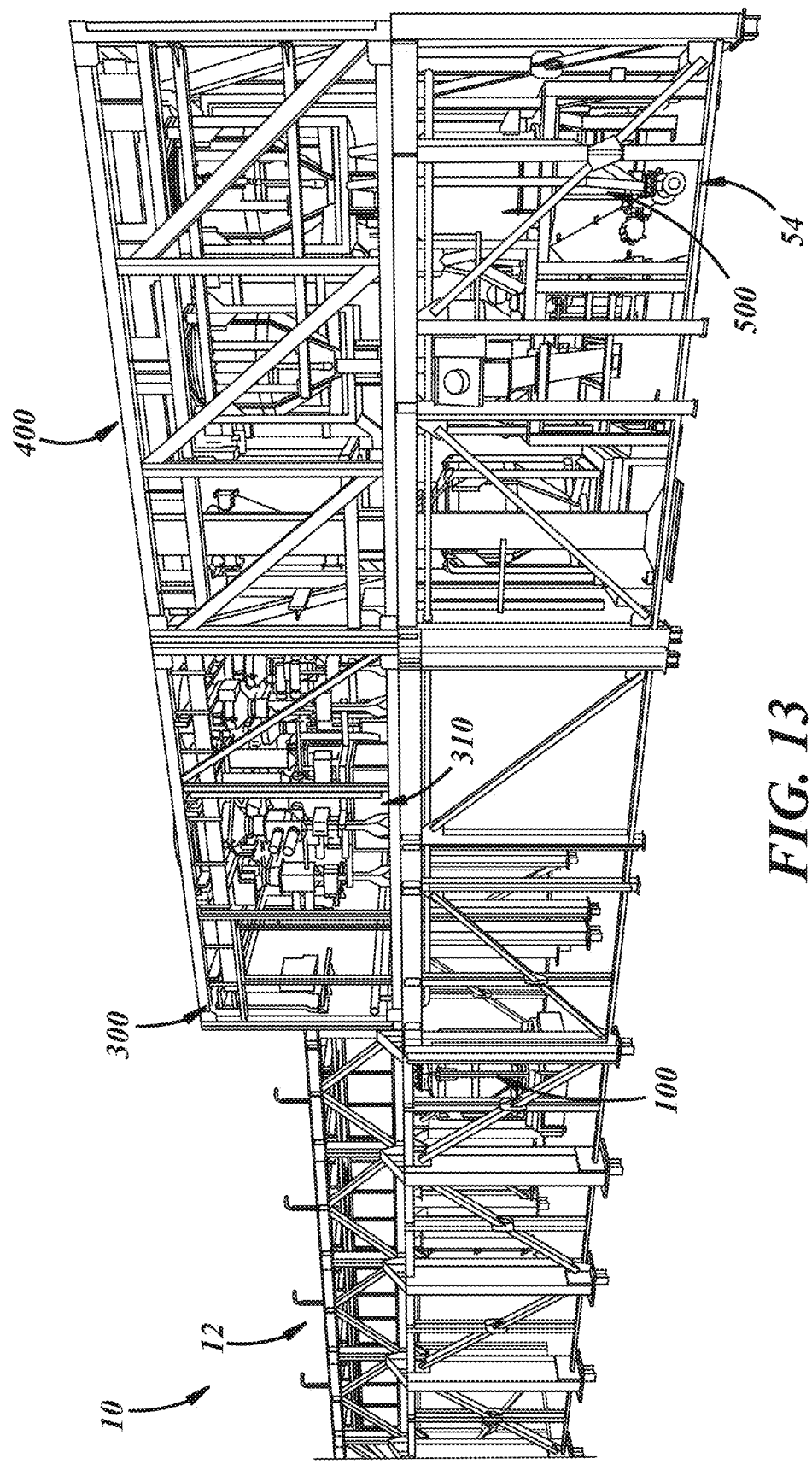
FIG. 13 is another perspective view of various modules of the system of FIG. 1A opposite that of FIG. 12.
Figure 18:
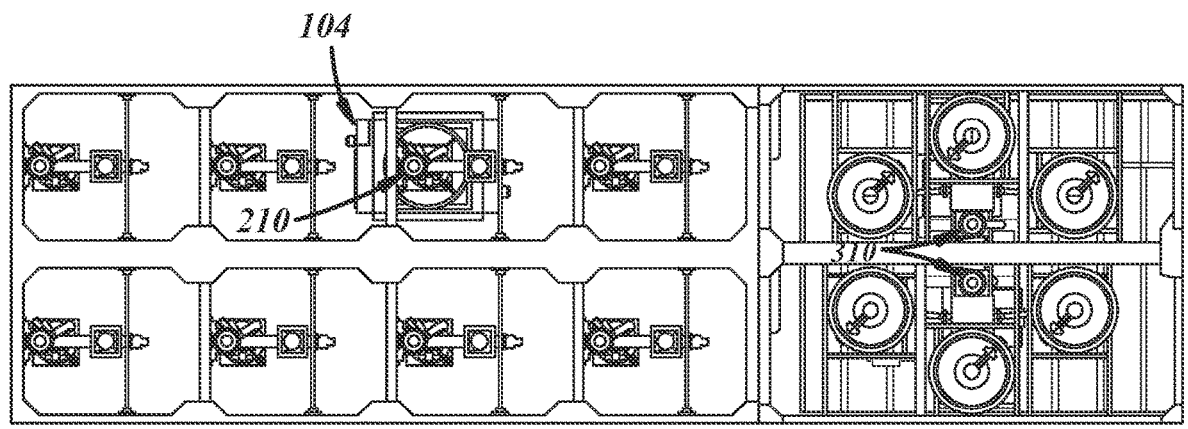
FIG. 18 is a plan view of the transport unit of FIG. 14 at a first bulk material dispenser.
Figure 19:
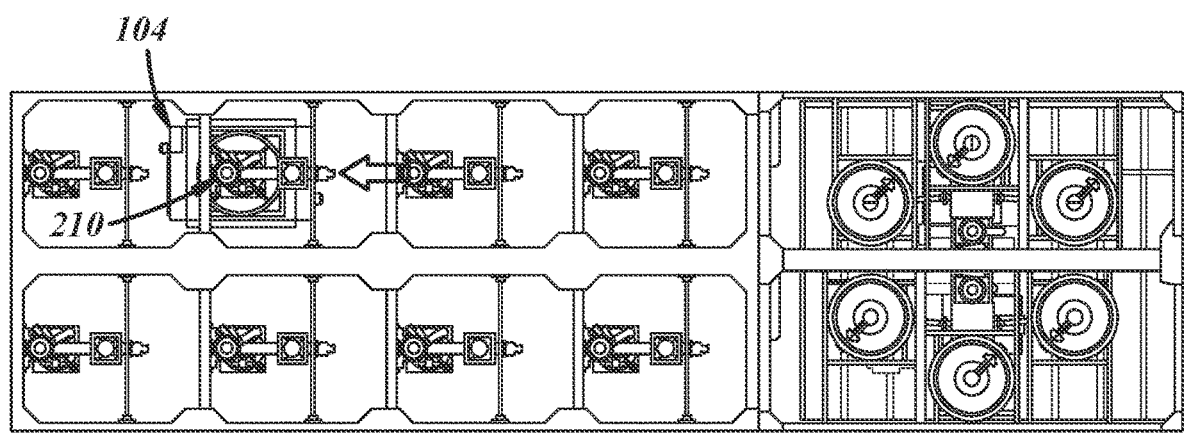
FIG. 19 is a plan view of the transport unit of FIG. 14 at a second bulk material dispenser.
Figure 20:
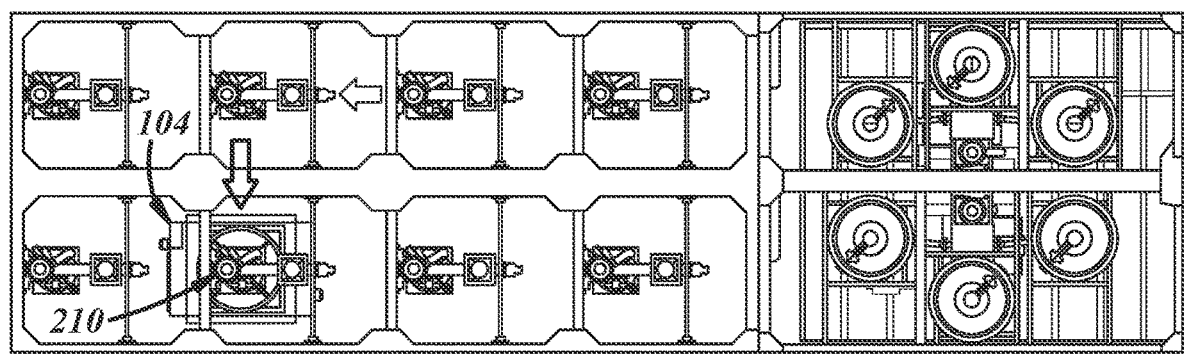
FIG. 20 is a plan view of the transport unit of FIG. 14 at a third bulk material dispenser.

The illustrated drive/steer system 116 provides zero-turning radius movement, meaning that the vehicle 104 can make 90-degree turns by stopping movement in one direction, steering the drive wheel(s) 90 degrees about a vertical axis, then powering the drive wheel(s) again to move in a new perpendicular direction. In some embodiments, the larger system 10 may be strategically laid out to minimize the number of turns the vehicle must make while retrieving and transporting bulk materials from different locations. The plan views of FIGS. 18-20 illustrate an example. In FIG. 18, the transport unit 100 is at a first location beneath a dispenser 210 of a dispenser array, in which the dispensers are spaced at regular intervals. After receiving bulk material from the dispenser at the first location, the AGV 104 moves the transport assembly to a second location to dock with a different dispenser of the array (FIG. 19) to receive another bulk material, and then moves in a perpendicular direction to a third location to dock with another dispenser of the array (FIG. 20) to receive another bulk material. In this manner, wasted turning movements are eliminated. As shown in FIG. 11, for example, the handling station 410 of the handling module 400 may be aligned with one row of the array of dispensers 210 to achieve further straight-line movement. And while the dispensers 310 of the minors subsystem are not perfectly in-line with the dispensers 210 of the majors subsystem, they can be nearly aligned and/or aligned with each other in a perpendicular direction. The vehicle 104 can thus be moved along the floor of the installation in the manner of chess pieces on a chess board, with faces of the AGV 104 always facing in the same direction.

Returning now to FIGS. 16-17, the illustrated platform 118 is vertically movable with respect to the body 114 of the AGV 104 such that the AGV can maneuver beneath the transport assembly 102 and extend the platform upward from a retracted position to lift the transport assembly 102 off of the ground for relocation as a complete transport unit 100. As illustrated in FIG. 16, the platform 118 may include one or more locators 120 that mate with complimentary locators along a bottom side of the table 110 of the weighing platform 108. The mating locators ensure that the transport assembly 102 is in a known position with respect to the underlying vehicle 104, which is the part of the unit 100 being guided. Alternatively, the transport assembly may be equipped to change its own height to lower itself onto the vehicle 104 and/or lift itself from the vehicle when necessary to respectively be moved or stay in place.

The power source charging system 120 is a wireless battery charger, such as an inductive charger. A mating part of the charging system may be located at any one or more of the various locations to which the transport unit 100 normally travels. In one embodiment, the mating part of the charging system is located along the floor at the transport handling station 410. Other charging arrangements may be employed.

While AGVs offers a great degree of flexibility as vehicles 104 of the transport system 44, an AGV is not required. Any sort of vehicle capable of moving the transport assembly 102 from location-to-location may be used, whether a forklift, a pallet jack, a hand cart, or an overhead lift.

Figure 21:
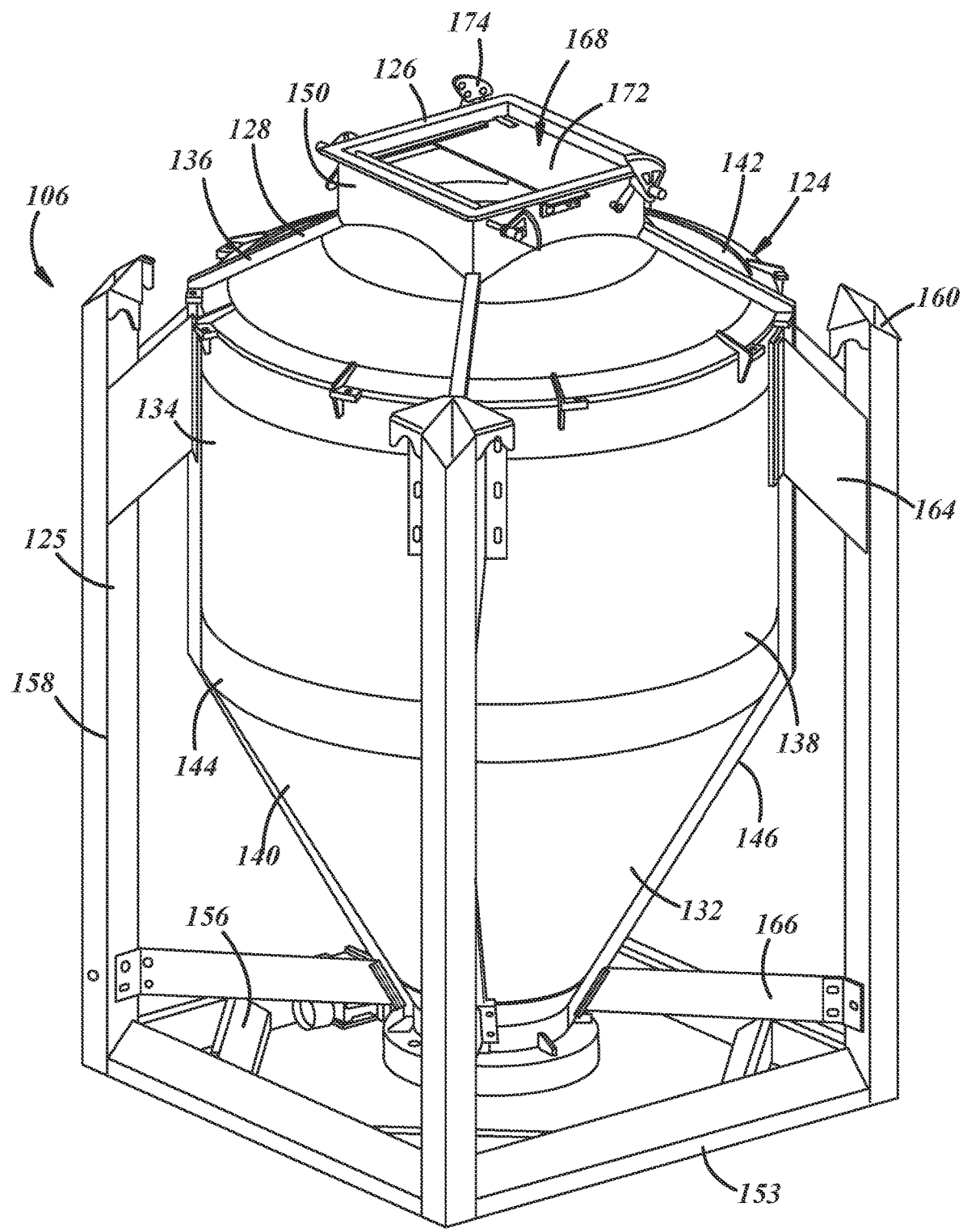
FIG. 21 is an isometric view of a bulk material transporter of the transport unit of FIG. 14.
Figure 22:
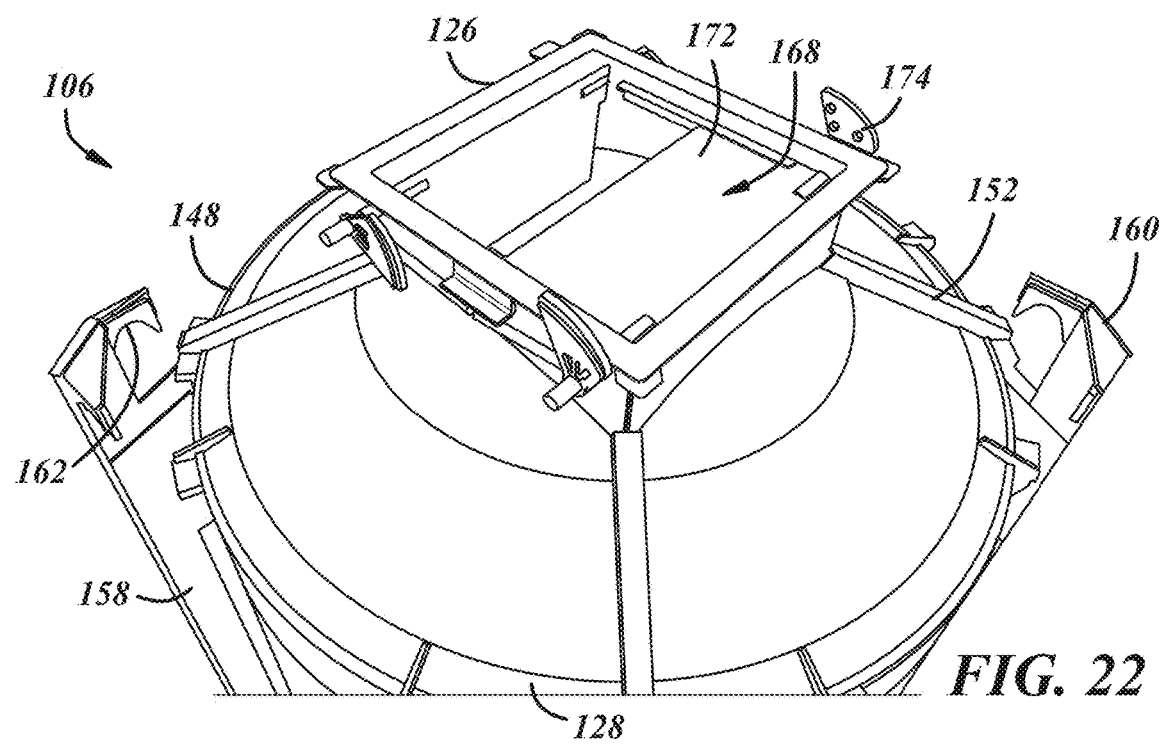
FIG. 22 is a perspective view of an inlet of the transporter of FIG. 21.
Figure 23:
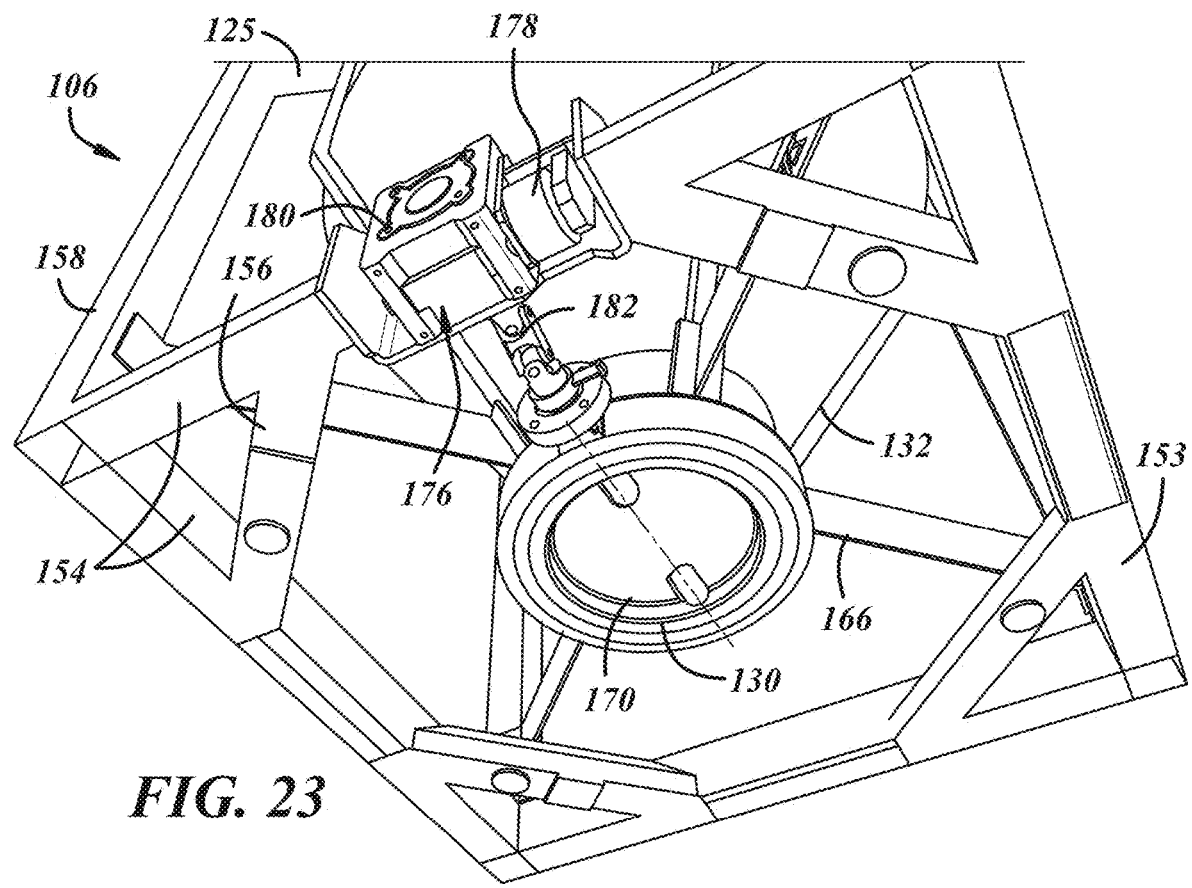
FIG. 23 is a perspective view of an outlet of the transporter of FIG. 21.

Turning now to FIGS. 21-23, the bulk material transporter 106 includes a hollow transport bin 124 supported by a frame-like cradle 125 and having an inlet 126 at a first or top end 128, and an outlet 130 at a second or bottom end 132. The illustrated transport bin 124 is formed as a wall 134 that at least partially defines the hollow interior of the bin and an exoskeleton 136 that extends along an exterior of the wall 134 and interconnects the inlet 126 and outlet 130 of the bin. A central portion 138 of the wall 134 is cylindrical, a lower portion 140 of the wall is generally conical, tapering down toward the outlet 130, and an upper portion 142 of the wall has a convex exterior or frustoconical shape and carries the inlet 126. The upper portion 142 may be separable from the remainder of the wall 134 in the form of a removable lid.

At least a portion of the wall 134 of the bin 124 may be formed from a polymer-based material. Polymer-based materials can offer a significant weight savings over metal, and in some cases can be more wear resistant. The polymer-based material may also be a pliable material. Here, "pliable" means the material is elastically deformable in a flexural mode and will return to its original shape after deformation. The pliable material is preferably an elastomeric material, such as a vulcanized rubber material or a polyurethane rubber. Given the heavy loads of bulk material to be carried by the bin 124, it may have a substantial wall thickness on the order of 15-25 mm. Using polymeric materials for batch containers with such heavy bulk materials (e.g., sand, limestone, etc.) is unconventional. However, it has been found that use of a pliable wall material facilitates discharge of the bulk material from the bin after all bulk materials have been received by the bin. In particular, the pliable wall 134 can be purposefully and locally deformed to break-up the very dense conglomeration of particulate bulk material in the bin during discharge from the outlet. A traditional metal bin can of course not be elastically deformed—meaning that, if the heavy load of particulate bulk material is compacted too much to drain from the bin via gravity feed, the only way to break the compacted material away from the wall is scraping along the inside of the bin wall.

Use of a pliable material in wall of the transport bin 124 is made possible in part by the exoskeleton 136. The exoskeleton 136 is formed from a rigid, non-pliable material such as a metallic material (e.g., steel) or a highly reinforced polymer composite (e.g., a fiberglass or carbon fiber composite). In the illustrated example, the exoskeleton 136 includes circumferential bands 144 along the central portion and lower end of the bin wall and longitudinal ribs 146 interconnecting all of the circumferential bands. The portion of the exoskeleton 136 along the lid or upper portion 142 of the bin wall has an annular portion 148 at the outer edge, a standing portion 150 surrounding the inlet 126, and radial ribs 152 interconnecting those portions in alignment with the longitudinal ribs 146 of the central and lower portions. The exoskeleton 136 also provides locations for attachment of the transport bin 124 to the cradle 125.

The cradle 125 is frame-like in construction and may be constructed from tubular steel members or the like. The cradle 125 includes a bottom 153 having a polygonal (e.g., rectangular) perimeter formed from multiple bottom frame members 154 arranged end-to-end. The illustrated cradle bottom 153 additionally includes angled reinforcing members 156 interconnecting adjacent bottom frame members 154. The cradle 125 further includes upright members 158 extending from corners of the bottom 153 to a free end 160. Engagement features 162 are provided at the ends 160 of the uprights 158. In this example, the engagement features 162 are in the form of hooks or downward facing cut-outs and can be used by other machinery of the larger system 10 to lift the transporter 106, such as a handler or elevator of the handling module 400. Other engagement features are possible, including but not limited to pins or posts, pin-receiving apertures, latches, pulleys, etc. Finally, the illustrated cradle 125 includes radial braces 164 extending from each upright to interconnect the cradle with the transport bin 124 via the top circumferential band 144 and the bin wall 134. Additional bracing 166 is provided between the cradle 125 and the exoskeleton 136 near the outlet 130 of the transporter 106.

Notably the cradle 125 is constructed such that it fully supports the weight of the transport bin 124 only along the perimeter of the bin, and the upper end of the cradle is open—i.e., there are no cross-members boxing off the ends 160 of the uprights 158 as with a traditional support frame. The illustrated construction permits the inlet 126 to be located above the cradle 125 so that the cradle does not interfere with dosing or docking equipment, yet still provides structure for lifting the transporter 106 when not receiving bulk material from a material dispenser. As shown in FIG. 23, a central portion of the bottom 152 of the cradle is also open and accessible for being coupled with a different receiving vessel in a relatively dust-free manner when discharging the contents of the bin 124.

The transporter 106 includes an inlet closure 168 at the inlet 126 and an outlet closure 170 at the outlet 130. Each closure 168, 170 has an open position and a closed position. When the inlet closure 168 is in the open position, the hollow inner volume of the bin 124 can be accessed through the inlet 126, and bulk material can be received into the bin from above. When the inlet closure 168 is in the closed position, access to the inner volume of the bin 124 is blocked by the closure. In the illustrated example, the inlet closure 168 comprises a pair of doors 172. For purposes of illustration, one door 172 is illustrated in the closed position (horizontal and partially spanning the inlet 126), and the other door is illustrated in the open position (vertical and extending downward toward the internal volume of the bin). The doors or other closure elements are biased toward the closed position (e.g., via a spring) or otherwise are normally kept in the closed condition until some action is taken to open the inlet 126. In this example, each door 172 is hinged and pivots about an axis near an edge of the inlet 126 against a bias. The closure 168 includes levers 174 fixed to the hinge pins of each door 172 that operate to open the respective door when pressed downward from above.

Figure 25:
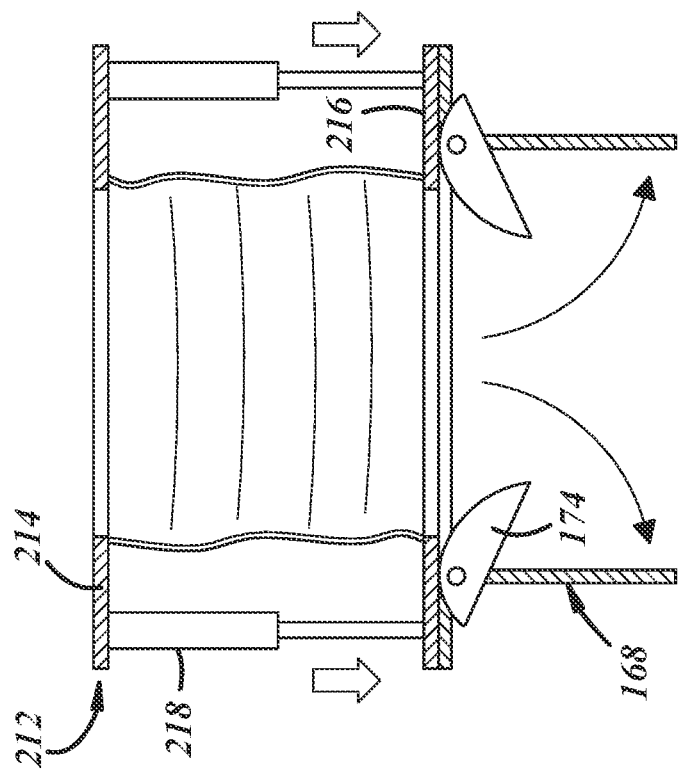
FIG. 25 is a schematic representation of the docking assembly of FIG. 24 coupled with the transport bin inlet.
Figure 24:
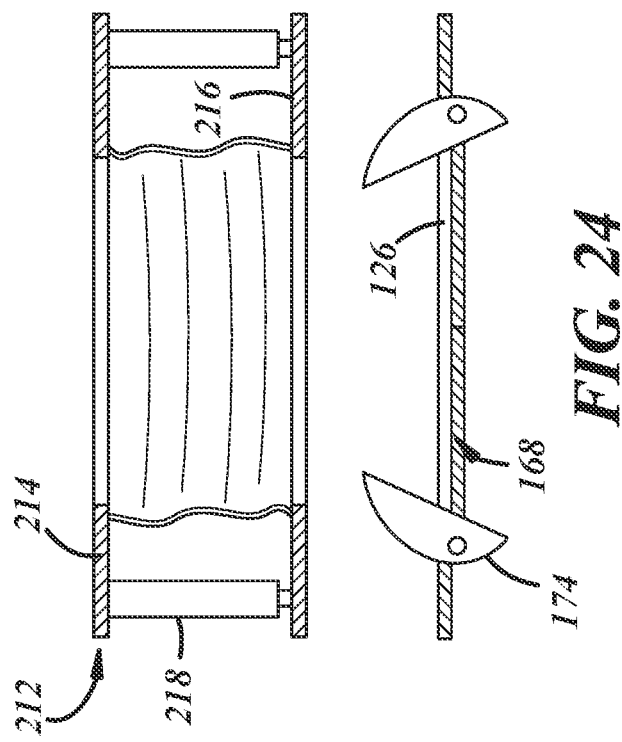
FIG. 24 is a schematic representation of a docking assembly uncoupled from a transport bin inlet.

A schematic representation of the operation of the illustrated inlet closure 168 is provided in FIGS. 24 and 25. An illustrative docking assembly 212 has an upper portion 214 coupled with a stationary bulk material dispenser and a lower portion 216 that moves under the power of actuators 218. When uncoupled, such as before or after dispenser operation as in FIG. 24, the closure 168 is in the closed position. During docking and before dispensing, downward movement of the lower portion 216 of the docking assembly 212 contacts the levers 174 of the closure 168. Continued downward motion of the docking assembly opens the closure 168 as in FIG. 25, and the closure remains in the open position as long as the transporter 106 is docked. When the docking assembly 212 moves away from the transporter, the closure returns to the closed position of FIG. 24. This is but one example of an inlet closure 168. Other types of doors or other physical barriers that can be opened, moved aside, or can otherwise be made to closably permit access to the internal volume of the bin 124 can be employed.

When the outlet closure 170 is in the closed position, as in FIG. 23, access to the inner volume of the bin 124 is blocked by the closure, and any bulk material contained in the bin is not permitted to escape the bin under the influence of gravity. When the outlet closure is in the open position, the inner volume of the bin is connected with the space below the bin, and any bulk material contained in the bin are permitted to escape through the outlet 130. As with the inlet closure 168, the outlet closure 170 is biased toward or otherwise normally kept in the closed position until some action is taken to open the outlet 130. In the illustrated example, the outlet closure 170 is a hinged plate slightly recessed in the outlet 130. The hinge pins of the plate lie along a pivot axis extending through the center of the round plate. One side of the hinge pins is operatively coupled with a mechanical transmission 176.

The transmission 176 is carried by the cradle 125 and includes a rotational input 178, a gearbox 180, and a linkage 182. The rotational input 178 is a friction wheel or gear that is accessible from below and/or from the transmission side of the cradle 125 and is configured to rotate about a horizontal axis. The gearbox 180 transmits rotation of the input 178 to the linkage 182 and changes the axis of rotation by about 90 degrees (e.g., via bevel gears or a worm gear). The rotating linkage 182 causes the closure to pivot about its axis to change the closure between the open and closed positions, depending on the direction of rotation of the rotational input. Where the rotational input 178 is a friction wheel, a mating friction wheel of another portion of the overall system can be pressed on the wheel and rotated in one direction to open the closure 170, to thereby discharge the contents of the bin 124 into an underlying receiving vessel, and in the opposite direction to close the closure to prepare the bin to be refilled. This is of course only one example of a suitable closure, as nearly any movable barrier can serve the same purpose of opening and closing the outlet 130 of the transporter 106.

Figure 26:
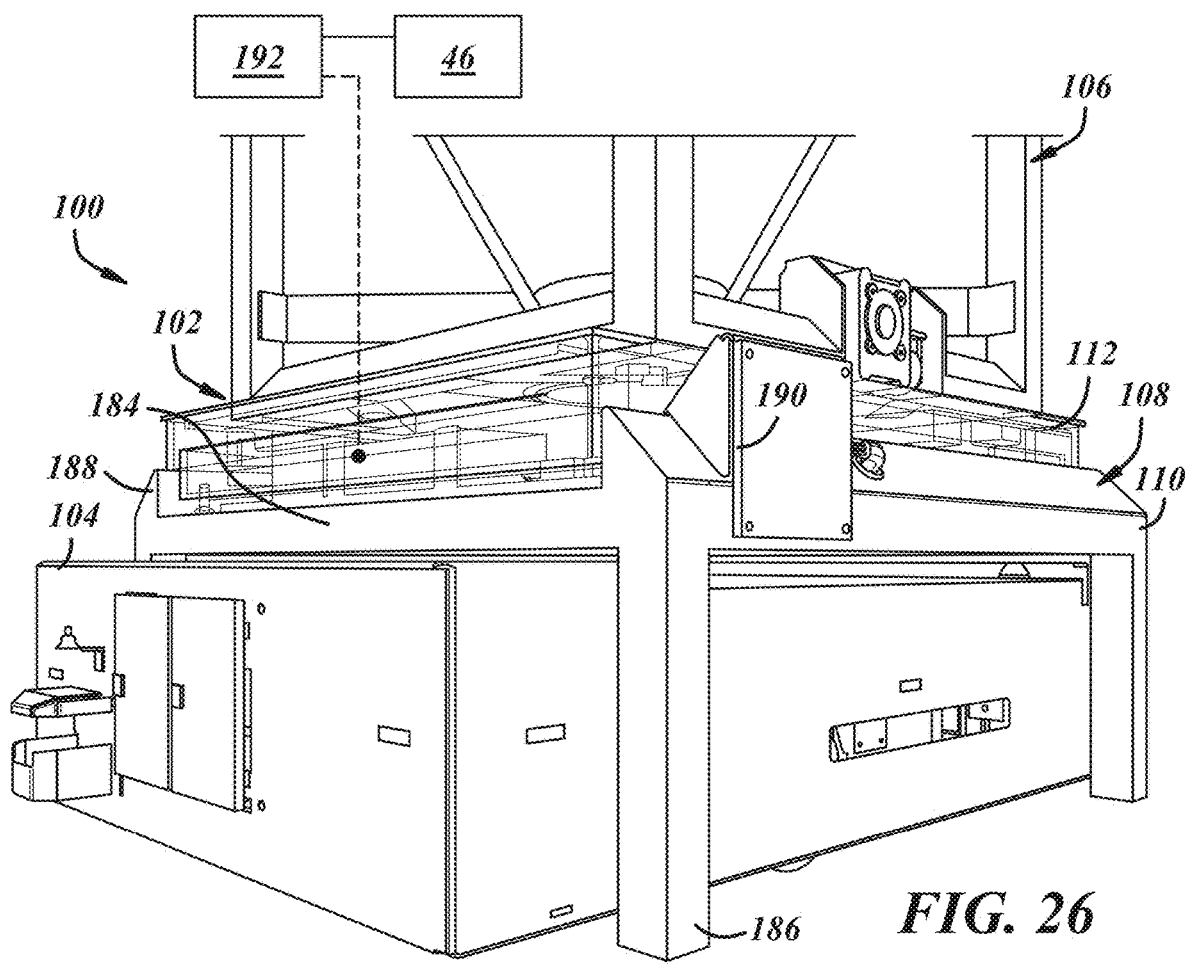
FIG. 26 is a perspective view of a weighing platform of the transport unit of FIG. 14.

With reference to FIG. 26, the weighing platform 108 is essentially a mobile scale, including a table 110 and a scale 112 that are attached together for movement together from location to location by the vehicle 104. This mobile scale is new to the bulk material handling industry, and particularly to glass feedstock handling. Conventionally, bulk material is dispensed from enormous silos into an open-top vessel supported by a platform built-in to the floor with stationary load cells used to weigh out the discharged material. The presently disclosed transport system 44 and transport units 100 go against convention and provide an essentially dust-free environment in which a more accurate mobile scale can effectively operate and communicate with dosing equipment for high precision measurement and dispensing of bulk materials.

Figure 27:
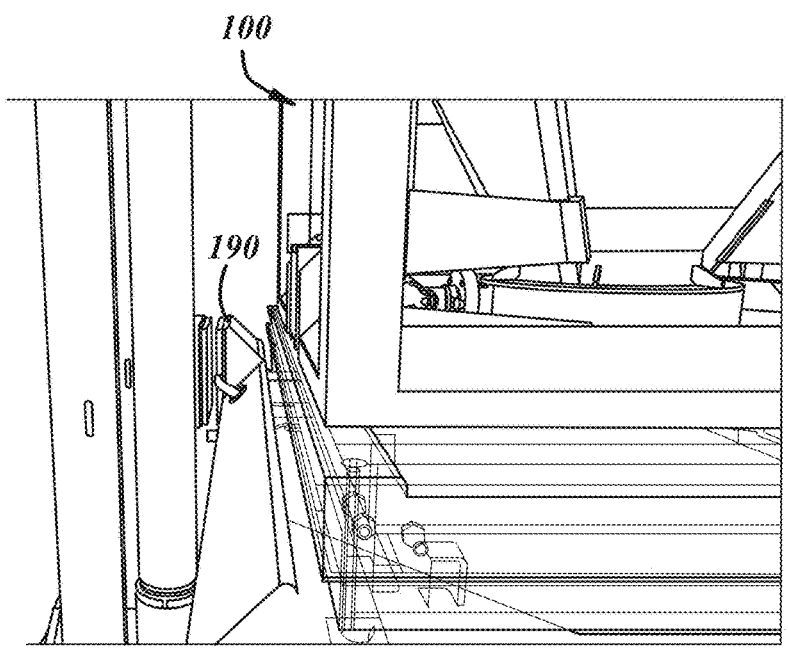
FIG. 27 is a perspective view of a charging interface of the platform of FIG. 26.

The table 110 includes a deck 184 with an upward facing surface that is flat or otherwise shaped to properly support the scale 112 from below. The illustrated table 110 also includes legs 186 extending downward from the deck 184 and an upwardly extending lip 188 along opposite edges of the deck 184. The illustrated table 110 carries a wireless charging receiver 190 coupled with the battery of the scale 112 and configured to link to a wireless charging transmitter. In one embodiment, the system 10 includes a wireless charging transmitter at a particular location where the transport unit is often parked, such as at the above-described handling module 400 of the system. FIG. 27 depicts the transport unit parked at one such location.

The legs 186 of the table 110 or assembly 102 are spaced to accommodate the AGV 104 or other lifting vehicle moving beneath the deck 184 from outside the perimeter of the deck. In this case, the legs 186 are spaced apart by slightly more than the width of the system AGV 104 so that the AGV can move beneath the deck from an external location, lift the transport assembly 102 or weighing platform 108 to relocate it, lower the transport assembly or platform 108 at the new location, and move out from beneath the deck 184 in the same or opposite direction.

The scale 112 is a high-capacity industrial scale, may have a capacity of approximately 2000 lbs., and may be in wireless communication with a controller 192 that monitors the weight on the scale 112 in real-time. The controller 192 may be in communication with or a part of the controls subsystem 46, which is capable of controlling bulk material dispensing equipment, such as the above-mentioned dispensers 210 based on the information communicated from the scale 112. The controller 192 may also be capable of taring the scale 112 once the transport assembly 102 is docked with a dispenser assembly.

In some embodiments, the controls subsystem 46 monitors the amount of bulk material dispensed into the transport bin 124 in real-time and compares that amount to a desired amount. When the amount dispensed approaches the desired amount and is within about 10% of the desired amount, the controls subsystem can change a dispensing rate to a slower rate for the final amount of bulk material and thereby achieve relatively precise dispensing. Real-world results of +/−0.1% or lower have been achieved with this system. Various arrangements of communication with the scale, both wired and wireless, and associated control of bulk material dispensing are possible.

Figure 28:
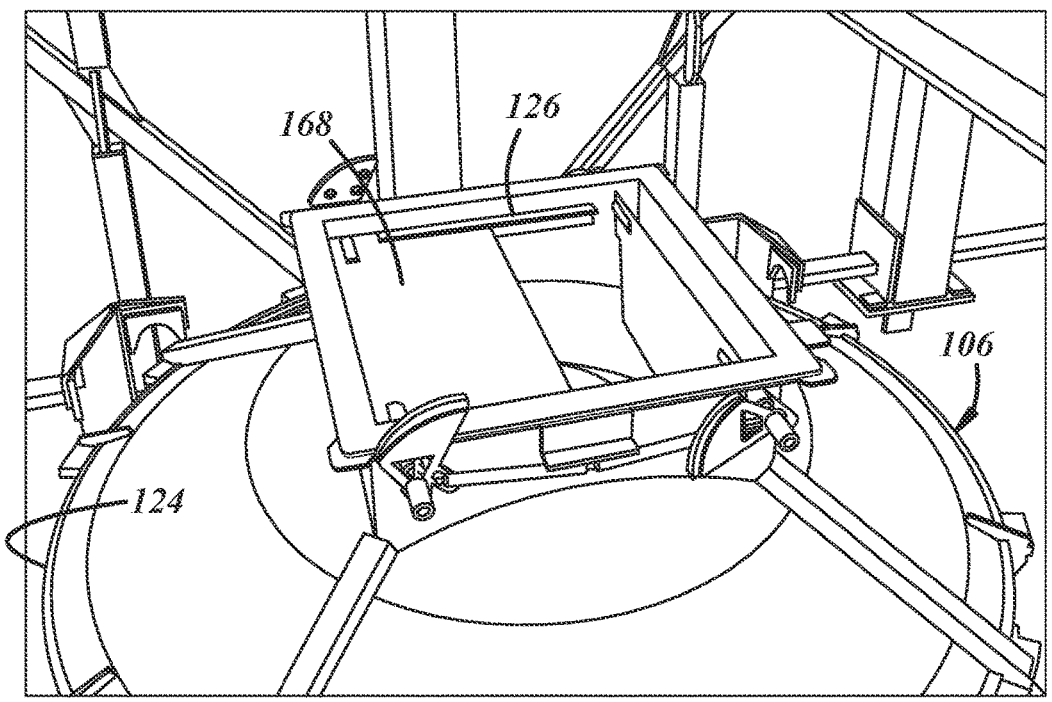
FIG. 28 is a perspective view of an uncoupled inlet of the transport unit of FIG. 14.
Figure 29:
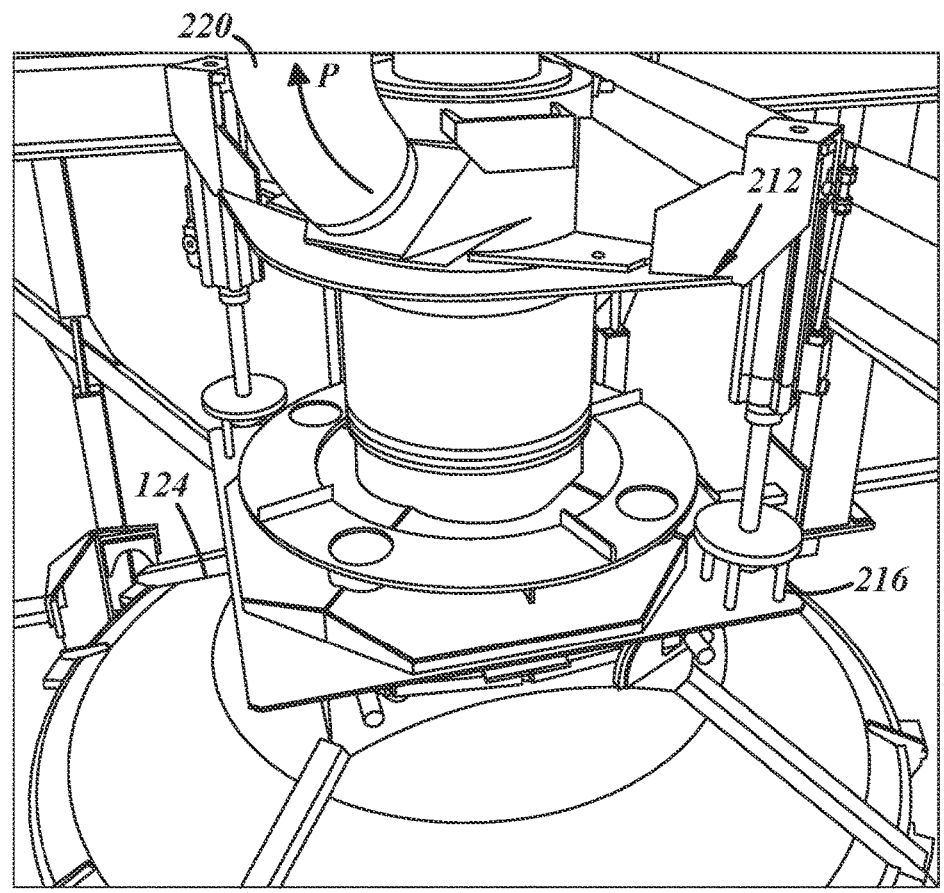
FIG. 29 is a perspective view of a coupled inlet of the transport unit of FIG. 14.
Figure 30:
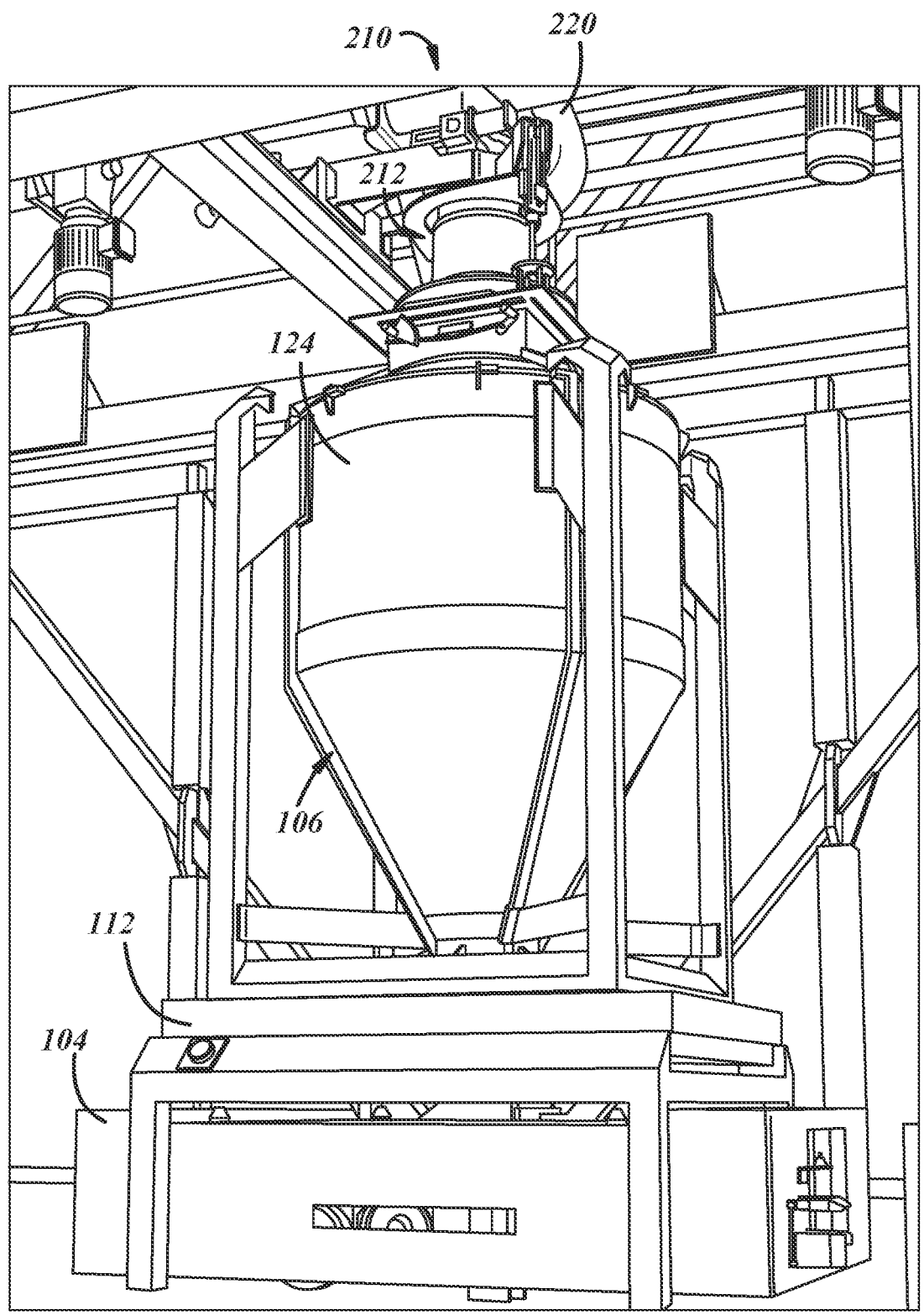
FIG. 30 is a perspective view of the transport unit of FIG. 14 coupled with a bulk material dispenser.

The above-described bulk material transport system 44, transport assembly 102, and transport unit 100 are useful in a bulk material handling method. With reference to FIGS. 28-30, the method may include coupling the transport bin 124 with a bulk material container (not shown) via a bulk material dispenser 210, forming a reduced pressure region at least at the inlet 126 of the transport bin, and dispensing bulk material from the bulk material container and into the transport bin through the reduced pressure region. FIG. 28 illustrates the inlet 126 of a bulk material transporter 106 and transport bin 124 before coupling or docking. FIGS. 29-30 illustrates the transporter 106 docked or otherwise coupled with the bulk material dispenser 210. Here, the transport bin 124 is coupled with the dispenser 210 when the lower portion 216 of the docking assembly 212 of the dispenser moves downward and makes interfacial contact with the perimeter of the inlet 126. Other manners of coupling are possible, including overlapping or interlocked couplings. In the illustrated example, the coupling step also opens the inlet closure 168 as described above.

After coupling, the reduced pressure region is formed at the coupled inlet 126 by pulling a vacuum on the combined hollow volume of the transport bin 124 and the docking assembly 212. In this example, a vacuum or negative pressure (−P) is applied via a vacuum port and conduit 220 in communication with the internal volume of the docking assembly. The resulting low pressure region within the docking assembly 212 and transport bin 124 ensures that the dust- or solids-laden air displaced from the transport bin 124 during dispensing does not escape the coupled system. The scale 112 is then tared (i.e., set to zero), and dispensing begins via a bulk material conveyor atop the docking assembly 212 or other means. As the dispensed amount, according to the scale 212, approaches the desired amount, dispensing may be slowed as described above and finally halted when the desired amount is obtained. The docking assembly 212 may then uncouple from the transport bin 124, which causes the inlet closure 168 to return to the closed position. If the vehicle 104 that brought the transport assembly 102 to the dispenser 210 has since departed, it or another vehicle can then return to lift the transport assembly and relocate it to another bulk material dispenser or to the handling module 400 for further processing.

Figure 31:
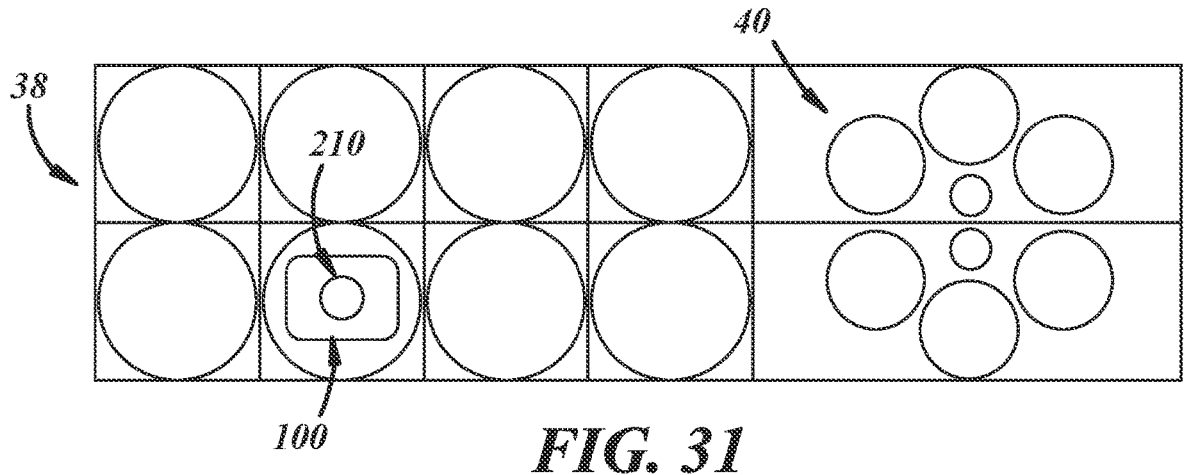
FIG. 31 is a schematic plan view of a transport unit at a first bulk material dispenser.
Figure 32:
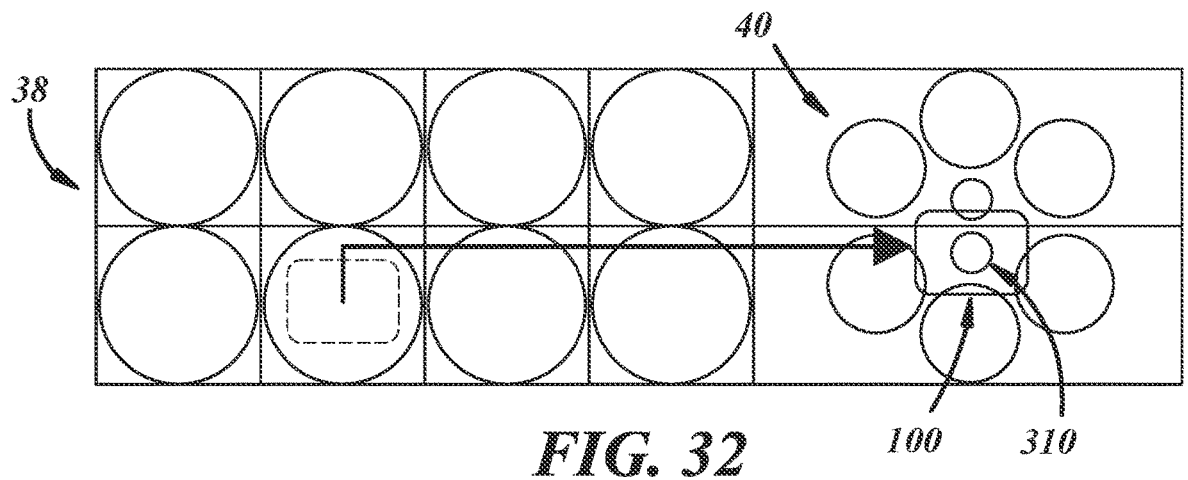
FIG. 32 is a schematic plan view of a transport unit at a second bulk material dispenser.
Figure 33:
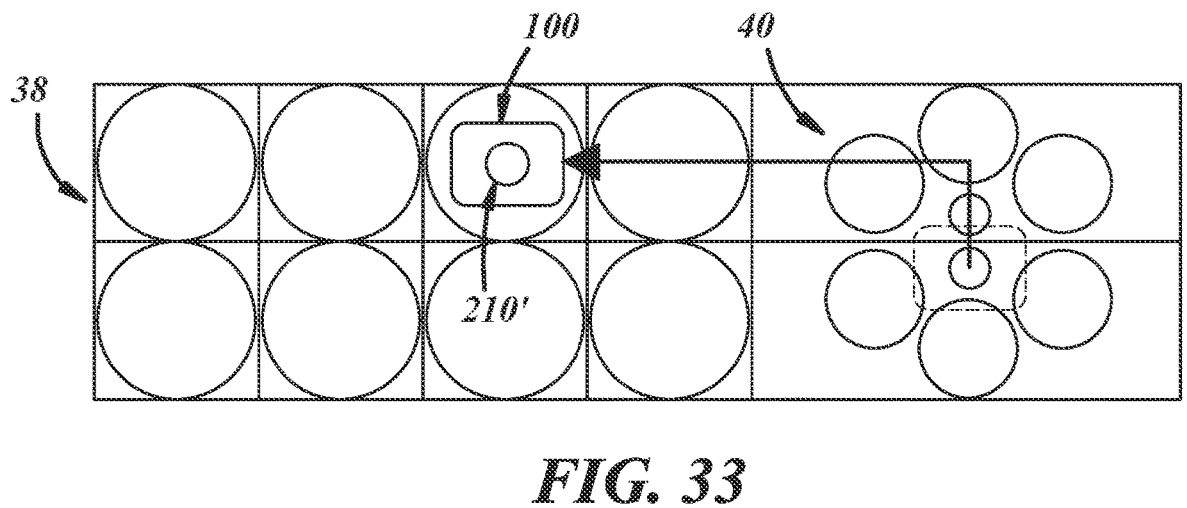
FIG. 33 is a schematic plan view of a transport unit at a third bulk material dispenser.

The above-described system can strategically result in a layered or stratified configuration of different types of bulk materials in the transport bin 124 as follows. With reference to FIGS. 31-33, an illustrative bulk material handling method may include first locating the bulk material transport unit 100 at a first bulk material dispenser 210 of the system 10 (FIG. 31), coupling the transport bin with the dispenser 210 and receiving a first type of bulk material in the transport bin, uncoupling the transport bin from the first dispenser 210, relocating the transport unit 100 or the associated transport bin to a second bulk material dispenser 310 (FIG. 32), coupling the transport bin with the second dispenser 310 and receiving a second type of bulk material in the transport bin, uncoupling the transport bin from the second dispenser 310, relocating the transport unit 100 or the associated transport bin to a third bulk material dispenser 210' (FIG. 33), and coupling the transport bin with the third dispenser 210' and receiving a third type of bulk material in the transport bin.

The result is a layered or stratified configuration of at least three different types of bulk material in the transport bin. While this may not be surprising on its own, the order in which the different bulk materials are dispensed can be made advantageous in some instances. In the illustrated example, the first and third dispensers 210, 210' are in the majors subsystem 38, and the second dispenser 310 is in the minors subsystem 40. The amount of material dispensed at the minors subsystem may be significantly less that at the dispensers of the majors subsystem. Indeed, in embodiments where the bulk material handling system is a glass feedstock handling system, the amount of minors feedstock added to the transport bin in a typical batch is too low to be accurately weighed using the same scale 112 as that used with the majors feedstock, and the minors feedstock materials must therefore be weighed separately from the majors feedstock before dispensing instead of during dispensing.

Interposing the relatively small layer of minors feedstock between relatively large layers of majors feedstock helps ensure the accuracy of the batch mixture upon discharge from the transport bin. In other words, such a layered structure of bulk materials keeps the small amount of minors feedstock away from the walls of the bin so that all of it is discharged with the full mixture. If, for example, the minors feedstock is added to the transport bin last, the small amount that may stick to the walls of the transport bin could be a significant percentage of the total amount of minors feedstock required in the batch.

It is noted that the illustrated number and arrangement of modules of the above-described system 10 is merely illustrative. For example, the illustrated bulk material dispensing modules 200 which form a 2×4 array of bulk material dispensers 210 can be expanded to a 3×4 array or a 4×4 array by adding additional modules 200. Or the installation 12 can be constructed with only one dispensing module 200 and a 1×4 array of dispensers 210. The same can be said for the minors-side modules 300 and dispensers 310. The added storage and dispensing capacity may also require expansion of the transport system 44 via additional transporter units 100, transporter assemblies 102, or vehicles 104. It is contemplated that a single AGV or other lift and transport vehicle 104 can offer sufficient capacity in an installation sized as that in the figures by moving multiple transport assemblies 102 from place to place. In another example of modularity, the majors and minors array may be expanded to provided bulk material batches that feed two different hot-side facilities with their own melting furnaces and post-melt shaping capabilities. In that case, additional handling modules 400 may be easily added to the discharging subsystem, including an additional transmission vessel 500, for example. Or an additional handling module and/or transmission vessel may be added to feed two separate hot-side facilities, even without expansion of the majors and minors relative capacities—for example, two different melt furnaces processing two very different glass formulations may be fed from the same transport subsystem via separate transmission vessels. The modular construction of the installation provides this and other types of flexibility without a total redesign of the facility.

As used in herein, the terminology "for example," "e.g.," "for instance," "like," "such as," "comprising," "having," "including," and the like, when used with a listing of one or more elements, is to be construed as open-ended, meaning that the listing does not exclude additional elements. Also, as used herein, the term "may" is an expedient merely to indicate optionality, for instance, of a disclosed embodiment, element, feature, or the like, and should not be construed as rendering indefinite any disclosure herein. Moreover, directional words such as front, rear, top, bottom, upper, lower, radial, circumferential, axial, lateral, longitudinal, vertical, horizontal, transverse, and/or the like are employed by way of example and not necessarily limitation.

Finally, the subject matter of this application is presently disclosed in conjunction with several explicit illustrative embodiments and modifications to those embodiments, using various terms. All terms used herein are intended to be merely descriptive, rather than necessarily limiting, and are to be interpreted and construed in accordance with their ordinary and customary meaning in the art, unless used in a context that requires a different interpretation. And for the sake of expedience, each explicit illustrative embodiment and modification is hereby incorporated by reference into one or more of the other explicit illustrative embodiments and modifications. As such, many other embodiments, modifications, and equivalents thereto, either exist now or are yet to be discovered and, thus, it is neither intended nor possible to presently describe all such subject matter, which will readily be suggested to persons of ordinary skill in the art in view of the present disclosure. Rather, the present disclosure is intended to embrace all such embodiments and modifications of the subject matter of this application, and equivalents thereto, as fall within the broad scope of the accompanying claims.

The invention claimed is:

1. A bulk material transporter, comprising:
   a hollow transport bin having an inlet and an outlet, the outlet being located at a tapered bottom portion of the bin;
   an inlet closure having an open position for receiving bulk material and a closed position for blocking the inlet while not actively receiving bulk material;
   an outlet closure having an open position for discharging bulk material from the bin and a closed position blocking the outlet while not actively discharging bulk material; and
   a cradle that supports the bin in an upright orientation during receiving of bulk material through the inlet and discharging of bulk material through the outlet, wherein the cradle supports the bin along a perimeter of the bin,
   wherein at least a portion of a wall of the hollow transport bin is formed from a pliable material that is elastically deformable in a flexural mode such that, after being deformed from an original shape, the material returns to the original shape.

2. The transporter of claim 1, wherein the cradle supports the bin only along said perimeter.

3. The transporter of claim 1, wherein the pliable material is an elastomeric material.

4. The transporter of claim 1, further comprising a rigid exoskeleton extending along an exterior of the wall of the bin to maintain a shape of the pliable material when the bin contains bulk material and to attach the bin to the cradle.

5. The transporter of claim 1, wherein the pliable material comprises a polymer.

6. The transporter of claim 1, wherein the cradle includes structural uprights spaced about the bin and interconnected by bottom members, and wherein upper ends of the structural uprights are not interconnected by cross-members.

7. The transporter of claim 1, wherein the cradle includes structural uprights spaced about the bin and interconnected by frame members and each structural upright is affixed to an exoskeleton of the bin by a radial member.

8. The transporter of claim 1, further comprising a transmission affixed to the cradle and configured to operate the outlet closure when actuated.

9. The transporter of claim 1, further comprising engagement features by which the transporter can be vertically raised and lowered.

10. A bulk material transport unit, comprising:
    a table;
    a scale supported by the table; and
    a transport bin supported by the scale,
    wherein the table, scale, and transport bin are together moveable among a plurality of locations along a floor, and
    wherein the scale is in communication with a controller configured to receive information pertinent to an amount of bulk material contained by the transport bin and the table has downwardly extending legs spaced from each other to accommodate a lifting vehicle between said legs and beneath a deck of the table.

11. The transport unit of claim 10, further comprising an automated guided vehicle (AGV) configured to move the table, scale, and transport bin together among said locations.

12. The transport unit of claim 10, wherein the table and scale are attached together to move together among said locations without the transport bin.

13. The transport unit of claim 10, further comprising a wireless charging interface for charging a power source of the scale while the table and scale are stationary at one of said locations.

14. The transport unit of claim 10, wherein the transport bin is removable from the scale to accommodate discharging of bulk material from the transport bin at one of said locations and to accommodate transport of the table and scale to a different one of said locations.

15. A bulk material transport unit, comprising:
a table;
a scale supported by the table; and
a transport bin supported by the scale,
wherein the table, scale, and transport bin are together moveable among a plurality of locations along a floor, and
wherein the scale is in communication with a controller configured to receive information pertinent to an amount of bulk material contained by the transport bin,
the transport unit further comprising locators to align the table with a vehicle configured to lift the table and scale for movement among said locations.

16. A material handling method, comprising:
coupling a transport bin with a bulk material container;
forming a reduced pressure region at least at an inlet of the transport bin; and
dispensing bulk material from the bulk material container and into the transport bin through the reduced pressure region.

17. The method of claim 16, wherein the inlet of the transport bin is closed before coupling, the method further comprising opening the inlet during coupling and maintaining the inlet in an open condition during dispensing.

18. The method of claim 16, further comprising:
measuring in real-time an amount of bulk material dispensed into the bin after coupling; and
halting the dispensing when said amount reaches a desired amount.

19. The method of claim 16, wherein the bulk material container is a first bulk material container and the bulk material is a first type of bulk material, the method further comprising:
decoupling the transport bin from the bulk material container;
transporting the transport bin to a second bulk material container;
coupling the transport bin with the second bulk material container; and
dispensing a second type of bulk material from the second bulk material container into the transport bin to form a layer of the second bulk material over the first type of bulk material.

20. The method of claim 19, further comprising:
decoupling the transport bin from the second bulk material container;
transporting the transport bin to a third bulk material container;
coupling the transport bin with the third bulk material container; and
dispensing a third type of bulk material from the third bulk material container into the transport bin to form a layer of the third type of bulk material over the first type of bulk material,
wherein an amount of the second type of bulk material dispensed into the transport bin is less than amounts of the first and third types of bulk materials dispensed into the transport bin.

21. The method of claim 20, wherein the first and third types of bulk materials are majors glass feedstock materials and the second type of bulk material is minors glass feedstock material.

22. The method of claim 16, wherein the transport bin is supported on a scale, and the scale is supported on a table during dispensing, the method further comprising:
using a vehicle to transport the table, scale, and transport bin to the bulk material container before coupling; and
using the same vehicle to transport a different table, scale, and transport bin to a different bulk material container for dispensing of a different bulk material into the different transport bin.

23. A material handling method comprising measuring an amount of glass feedstock dispensed from a bulk material storage container using a mobile scale.

24. The method of claim 23, further comprising dispensing the glass feedstock into a transport bin supported by the scale.

25. The method of claim 24, further comprising coupling the transport bin with a bulk material dispenser coupled with the storage container before dispensing, and taring the scale after coupling.

26. The method of claim 25, wherein the transport bin and scale are supported by a table during the coupling, dispensing, and measuring.

* * * * *